US012739576B2

(12) United States Patent
Strelcyk et al.

(10) Patent No.: US 12,739,576 B2
(45) Date of Patent: Sep. 15, 2026

(54) HEARING DEVICE-BASED SYSTEMS AND METHODS FOR MONITORING A LISTENING STATE OF A USER

(71) Applicant: SONOVA AG, Staefa (CH)

(72) Inventors: Olaf Strelcyk, Cincinnati, OH (US); Charlotte Vercammen, London (GB); Laurent Simon, Stäfa (CH); Stefan Klockgether, Hombrechtikon (CH); Gilles Courtois, Uerikon (CH)

(73) Assignee: Sonova AG, Staefa (CH)

( * ) Notice: Subject to any disclaimer, the term of this patent is extended or adjusted under 35 U.S.C. 154(b) by 204 days.

(21) Appl. No.: 18/617,089

(22) Filed: Mar. 26, 2024

(65) Prior Publication Data

US 2025/0310703 A1 Oct. 2, 2025

(51) Int. Cl.
*H04R 25/00* (2006.01)
*G06F 3/01* (2006.01)

(52) U.S. Cl.
CPC .......... *H04R 25/505* (2013.01); *G06F 3/012* (2013.01); *H04R 2225/43* (2013.01)

(58) Field of Classification Search
CPC .............. H04R 25/505; H04R 2225/43; H04R 2225/41; H04R 2225/61; H04R 25/55; H04R 25/70; H04R 25/407; H04R 2430/01; G06F 3/012; G10L 25/48
See application file for complete search history.

(56) References Cited

U.S. PATENT DOCUMENTS

| | | | | |
|---|---|---|---|---|
| 7,463,157 | B2 | 12/2008 | Victor et al. | |
| 10,339,960 | B2 * | 7/2019 | Dow | A61B 5/12 |
| 10,728,676 | B1 | 7/2020 | El et al. | |
| 10,798,499 | B1 | 10/2020 | El et al. | |
| 10,838,492 | B1 | 11/2020 | Whitmire et al. | |
| 10,933,239 | B2 | 3/2021 | Hillbratt | |
| 11,317,863 | B2 | 5/2022 | Xu et al. | |

(Continued)

FOREIGN PATENT DOCUMENTS

| | | |
|---|---|---|
| CN | 109727596 B | 3/2020 |
| DE | 102017214164 | 1/2019 |

(Continued)

OTHER PUBLICATIONS

European Search Report and Written Opinion in European Application No. EP25164001.7.

(Continued)

*Primary Examiner* — Tuan D Nguyen
(74) *Attorney, Agent, or Firm* — ALG Intellectual Property, LLC

(57) ABSTRACT

An illustrative hearing system may be configured to receive, from an input transducer included in a hearing device configured to be worn by a user, audio data representative of one or more audio signals presented to the user and acquire motion data representative of head movements of the user while the user wears the hearing device and/or own-voice data representative of an own-voice activity of the user. The hearing system may be further configured to determine, based the motion data and/or own-voice data, a listening state of the user with respect to the one or more audio signals and perform, based on the listening state, an operation associated with the hearing device.

19 Claims, 7 Drawing Sheets

(56) References Cited

U.S. PATENT DOCUMENTS

| | | | |
|---|---|---|---|
| 11,627,398 | B2 | 4/2023 | Guindi et al. |
| 2016/0373869 | A1 | 12/2016 | Gran et al. |
| 2022/0286791 | A1 | 9/2022 | Lunner et al. |

FOREIGN PATENT DOCUMENTS

| | | | |
|---|---|---|---|
| EP | 3684075 | A1 | 7/2020 |
| EP | 3684079 | A1 | 7/2020 |
| WO | 2021237368 | A1 | 12/2021 |

OTHER PUBLICATIONS

Hale Joanna et al., Are You on My Wavelength? Interpersonal Coordination in Dyadic Conversations, Journal of Nonverbal Behavior, Springer US, Boston, vol. 44, No. 1. Oct. 15, 2019.

* cited by examiner

HEARING DEVICE-BASED SYSTEMS AND METHODS FOR MONITORING A LISTENING STATE OF A USER

BACKGROUND INFORMATION

A hearing device may enable or enhance hearing by a user wearing the hearing device by providing audio content received by the hearing device to the user. For example, a hearing aid may provide an amplified version of the audio content to the user to enhance hearing by the user. As another example, a sound processor included in a cochlear implant system may provide electrical stimulation representative of the audio content to the user to enable hearing by the user.

In some situations, it may be desirable to operate a hearing device to enhance hearing of the user depending on how the user reacts to a speech from a speech source, e.g., whether the user is actively following a conversation with a conversation partner or not. Monitoring such user behavior during conversations can also be useful to discover potential health risks, e.g., with regard to hearing difficulties, cognitive abilities, emotional states, or social detachment. Unfortunately, a typical hearing device may not be equipped to estimate the user's listening state when exposed to a speech and to operate depending thereon.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
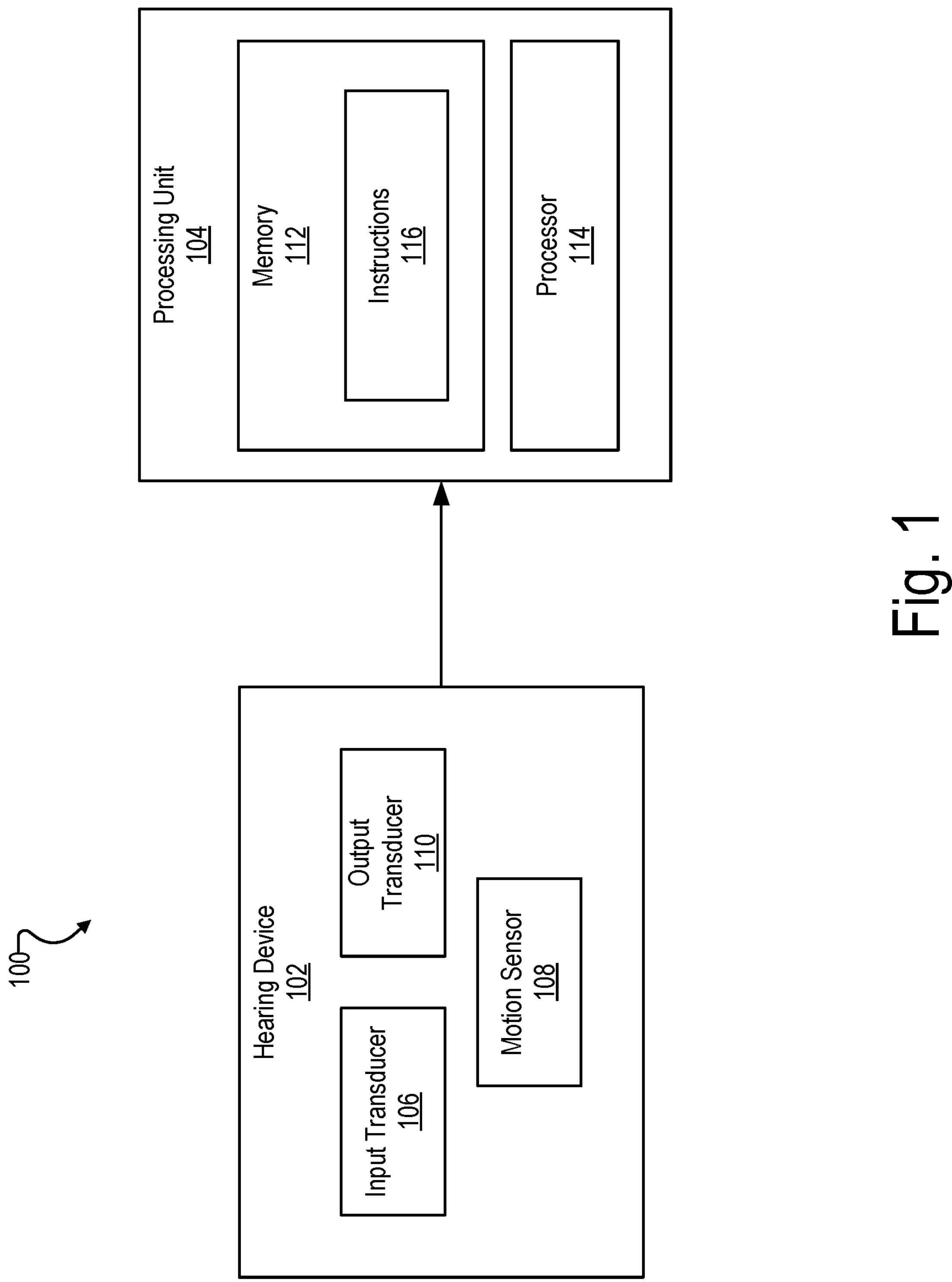
FIG. 1 shows an illustrative implementation of a hearing system.

An illustrative method, which may be performed by a hearing system, may include determining a listening state of a user based on motion data representative of motion of the user that may be received from a motion sensor included in a hearing device configured to be worn by a user and/or based on own-voice data representative of an own-voice activity of the user that may be included in audio data received from an input transducer included in the hearing device. The hearing system, when performing the method, may further be configured to perform, based on the listening state, an operation associated with the hearing device.

For example, the hearing system may be configured to receive, from an input transducer included in a hearing device configured to be worn by a user, audio data representative of one or more audio signals presented to the user, the audio data including one or more speech signals representative of a speech from one or more speech sources different from the user. The hearing system may be further be configured to acquire motion data, which may be received from a motion sensor included in the hearing device, the motion data representative of head movements of the user while the user wears the hearing device, and/or to acquire own-voice data, which may be included in the audio data, the own voice data representative of an own-voice activity of the user. Based on the motion data and/or the own-voice data, a listening state of the user may be determined with respect to the one or more audio signals. For example, the listening state may comprise information about whether or to which degree the user is paying attention to one or more of the speech sources; and/or information about whether or to which degree the user comprehends the speech in one or more of the speech signals.

Based on the listening state, an operation associated with the hearing device may be performed. For instance, the operation may comprise activating one or more sound processing properties of the hearing device (e.g., increasing a gain of the hearing device, increasing a volume of an output signal transmitted by an output transducer included in the hearing device, modifying a property of a beamforming (which may comprise activating or deactivating or adjusting a property of the beamforming, such as a directivity and/or beamwidth, wherein beamforming may be performed by combining the input of one or more microphones included in the hearing device, e.g., to enhance the one or more audio signals from a desired direction), selecting one or more microphones included in the hearing device to detect the one or more audio signals, extracting or separating one or more of the speech signals from the audio data, filtering the audio data to accentuate the one or more audio signals, etc.). As another example, the operation may include providing a notification indicating the listening state of the user and/or information derived from the listening state of the user. As another example, the operation may include selecting, e.g., depending on the listening state, one or more of the speech signals for an enrollment as an audio sample in an audio processing algorithm configured to provide for a processing of the audio data depending on the enrolled audio sample. As another example, the operation may include selecting, e.g., depending on the listening state, one or more of the speech signals for determining a direction of arrival (DOA) of the speech, wherein the direction of arrival is employed in an audio processing algorithm configured to provide for a processing of the audio data depending on the direction of arrival.

The hearing system may be implemented as the hearing device, or as the hearing device and a computing device communicatively coupled to the hearing device. For example, the system may comprise a memory storing instructions and a processor communicatively coupled to the memory, which may be included in the hearing device and/or the computing device, wherein the processor is configured to execute the instructions to perform the method.

The principles described herein may result in improved hearing systems compared to conventional systems that are not configured to determine a listening state of the user based on motion data and/or own-voice data, as well as provide other benefits as described herein. For example, such a hearing system configured to determine a listening state based on motion and/or own-voice of the user may provide a more desirable hearing enhancement for the user. Moreover, a hearing system configured to determine a listening state based on motion of the user may allow the hearing system to be more computationally efficient by adjusting one or more settings of the hearing system and/or performing other operations. For example, the hearing system may deactivate and/or abstain from activating the one or more sound processing properties of the hearing device when the user does not actively intend to listen to the speech in one or more of the speech signals.

In some examples, the determining the listening state may include classifying the listening state as one or more of an inattentive uncomprehending listening state, an attentive uncomprehending listening state, or a comprehending listening state. To illustrate, the inattentive uncomprehending listening state may be indicative of whether or to which degree the user is neither paying attention to the one or more speech sources nor comprehending the speech. The attentive uncomprehending listening state may be indicative of whether or to which degree the user is paying attention to the one or more speech sources but not comprehending the speech. The comprehending listening state may be indicative of whether or to which degree the user is comprehending the speech.

In some examples, the determining the information about whether or to which degree the user is paying attention to the one or more speech sources may include determining, based on the motion data and/or own-voice data, one or more characteristics indicative of a dyadic and/or social interaction of the user with one or more of the speech sources. For instance, the one or more characteristics indicative of a dyadic and/or social interaction may include indications of a coherent behavior, e.g., mimicry, and/or by a complementary behavior, e.g., nodding, of the user directed to the one or more speech sources, and/or a behavior lagging behind a leading behavior of the one or more speech sources, e.g., by a lag of at least 100 milliseconds. In some examples, the determining information about whether or to which degree the user is comprehending the speech may include determining, based on the motion data and/or own-voice data, one or more characteristics indicative of a speech comprehension, which may include, e.g., indications whether or to which degree the user is consciously aware of a content of the speech. In some examples, the listening state may be indicative of whether or to which degree the one or more characteristics indicative of the dyadic and/or social interaction of the user with one or more of the speech sources and/or of whether or to which degree the one or more characteristics indicative of speech comprehension are present in the motion data and/or the own-voice data, e.g., when the one or more audio signals are presented to the user.

In some implementations, the determining the listening state includes determining that the user comprehends the speech depending on whether or to which degree a frequency of the head movements is within a predetermined frequency range representative of the speech comprehension and/or depending on whether or to which degree one or more backchannels to the speech in the own-voice data fulfill a predetermined property representative of the speech comprehension. In some examples, the one or more characteristics indicative of speech comprehension may include the information about whether or to which degree the frequency of the head movements is within the predetermined frequency range representative of the speech comprehension and/or whether or to which degree the one or more backchannels to the speech in the own-voice data fulfill the predetermined property representative of the speech comprehension.

In some examples, the frequency range representative of the speech comprehension comprises frequencies larger than 2 Hertz, e.g., larger than 3 Hertz, or 4 Hertz, or 5 Hertz. In some examples, the frequency range representative of the speech comprehension has a lower limit of a frequency of 1.5 Hertz or larger, e.g., 2 Hertz. In some examples, the frequency range representative of the speech comprehension comprises frequencies between 2 Hertz and 6.5 Hertz, e.g., frequencies between 2 Hertz and 5 Hertz. In some examples, the frequency range representative of the speech comprehension consists of frequencies between 2 Hertz and 6.5 Hertz, e.g., frequencies between 2 Hertz and 5 Hertz. In some examples, the one or more backchannels in the own-voice data can comprise non-verbal backchannels, such as paralinguistic expressions, and/or verbal backchannels. In some examples, the property of the one or more backchannels in the own-voice data representative of the speech comprehension comprises at least one of a length, a complexity, a number, and a type of the one or more backchannels. In some implementations, the determining that the user comprehends the speech is based on a proportion of time during which the head movements are within the frequency range representative of the speech comprehension.

In some implementations, the determining the listening state includes determining that the user is paying attention to one or more of the speech sources depending on whether or to which degree a frequency of the head movements is within a predetermined frequency range representative of the user paying attention to one or more of the speech sources and/or depending on whether or to which degree one or more backchannels to the speech in the own-voice data fulfill a predetermined property representative of the user paying attention to one or more of the speech sources. In some examples, the one or more characteristics indicative of a dyadic and/or social interaction of the user with one or more of the speech sources may include at least part of the information about whether or to which degree the frequency of the head movements is within the frequency range representative of the user paying attention to one or more of the speech sources and/or whether or to which degree the one or more backchannels to the speech in the own-voice data fulfill the predetermined property representative of the user paying attention to one or more of the speech sources.

In some examples, the frequency range representative of the user paying attention to one or more of the speech sources comprises frequencies smaller than the frequencies in the frequency range representative of the speech comprehension. In some examples, the frequency range representative of the user paying attention to one or more of the speech sources comprises frequencies smaller than 2 Hertz, e.g., smaller than 1.5 Hertz, or 1.2 Hertz, or 1 Hertz. In some examples, the frequency range representative of the user paying attention to one or more of the speech sources has an upper limit, for instance a frequency of 2.5 Hertz or smaller, e.g., 2 Hertz, or 1.5 Hertz, or a frequency of 15 Hertz or smaller, e.g., 12 Hertz. In some examples, the frequency range representative of the user paying attention to one or more of the speech sources comprises frequencies between 0.1 Hertz and 2 Hertz, e.g., frequencies between 0.1 Hertz and 1.1 Hertz. In some examples, the frequency range representative of the user paying attention to one or more of the speech sources consists of frequencies between 0.1 Hertz and 2 Hertz, e.g., frequencies between 0.1 Hertz and 1.1 Hertz. In some examples, the property of the one or more backchannels in the own-voice data representative of the speech comprehension comprises at least one of a length, a complexity, a number, and a type of the one or more backchannels differing from the property of the one or more backchannels in the own-voice data representative of the speech comprehension.

In some implementations, the determining the listening state includes determining that the user is paying attention to one or more of the speech sources without comprehending the speech depending on a proportion of the head movements having a frequency within a frequency range representative of the speech comprehension and the head movements having a frequency within a predetermined frequency range representative of the user paying attention to one or more of the speech sources and/or depending on a proportion of the one or more backchannels fulfilling a property representative of the speech comprehension and one or more backchannels fulfilling a property representative of the user paying attention to one or more of the speech sources.

In some implementations, the determining the listening state includes determining that the user comprehends the speech depending on whether or to which degree a frequency of the head movements corresponds to a frequency of the speech. In some implementations, the audio data includes one or more music signals representative of a music, wherein the determining the listening state includes determining that the user is listening to the music depending on whether or to which degree a frequency of the head movements corresponds to a frequency, e.g., rhythm, of the music. In some examples, a listening state indicating that the user is listening to the music may be indicative of a listening state of the user not comprehending the speech, e.g., an inattentive uncomprehending listening state, or an attentive uncomprehending listening state.

In some implementations, the determining the listening state includes determining a listening intention of the user, e.g., based on the information about whether or to which degree the user is paying attention to one or more of the speech sources; and/or the information about whether or to which degree the user comprehends the speech in one or more of the speech signals. The listening intention may be indicative of whether or to which degree the user intends to listen to the speech in one or more of the speech signals. To illustrate, when the listening state indicates that the user is neither paying attention to one or more of the speech sources, nor comprehending the speech, the listening intention may be determined to be not true (e.g., false), or to have a rather small degree. As another example, when the listening state indicates that the user comprehends the speech, at least to a certain degree, the listening intention may be determined to be true, or to have a rather large degree.

In some implementations, the hearing system is configured to perform the process further comprising a determining a listening effort of the user. The listening effort may be indicative of whether or to which degree the user invests effort into a listening activity, e.g., whether or to which degree the user is investing his physical and/or mental resources in an attempt to comprehend the speech. In some instances, the listening intention may be determined based on the listening effort, e.g., in addition or alternatively to the listening state. To illustrate, a larger listening effort may indicate a larger listening intention, and a smaller listening effort may indicate a smaller listening intention.

In some implementations, the hearing system is configured to perform the process further comprising a determining a comprehension incapability state of the user based on the listening effort and the listening state, e.g., based on the information whether or to which degree the user invests effort into a listening activity and on the information whether or to which degree the user is paying attention to one or more of the speech sources; and/or on the information whether or to which degree the user comprehends the speech in one or more of the speech signals. The comprehension incapability state may be indicative of whether or to which degree the user is uncapable to comprehend the speech.

In some instances, the comprehension incapability state is determined based on the listening effort and the attentive uncomprehending listening state, which may be indicative of whether or to which degree the user is paying attention to the one or more speech sources but not comprehending the speech. To illustrate, when the attentive uncomprehending listening state is determined to be true or to have a rather large degree and the listening effort is also determined to be true or to be rather large, the comprehension incapability state may be determined to be true or to be rather large. This may relate to a situation in which the user has a comprehension problem which may be caused, e.g., by a problem with the user's hearing, e.g., due to a hearing loss and/or environmental sound disturbances, and/or a problem with the user's listening capabilities, e.g., due to a cognitive impairment and/or language barriers. Thus, the comprehension incapability state may also be employed as a health indicator which may provide information about a potential health problem of the user. As another example, when the attentive uncomprehending listening state is determined to be true or to have a rather large degree and the listening effort is determined to be false or to be rather small, the comprehension incapability state may be determined to be false or to be rather small. This may relate to a situation in which the user has no interest in comprehending the speech or has given up on comprehending the speech, e.g., the user is pretending to be paying attention to the speech source but is not listening, is not interested in a content of the speech or otherwise distracted.

In some implementations, the hearing system is further configured to acquire physiological sensor data indicative of a physiological property of the user; and, determining, based on the physiological sensor data, the listening effort exerted by the user, e.g., a physiological estimation the listening effort. E.g., the physiological sensor data may be received from a physiological sensor included in the hearing device and/or in a user device, e.g., a smartwatch or the like. E.g., the physiological sensor may be configured to provide heart rate data and/or blood pressure data, wherein an increased heart rate and/or blood pressure may indicate an increased listening effort. Other suitable physiological sensors may include, e.g., a bioelectric (e.g., EEG, ECG, EOG) sensor and/or a skin conductance sensor. E.g., a stress response of the user may be determined by a skin conductance sensor, which may be associated with a listening effort. In some implementations, the activating the one or more sound processing properties is further based on determining the listening effort exerted by the user. In some instances, the operation includes activating the one or more sound processing properties of the hearing device when the listening effort is determined to be true or being larger and/or deactivating the one or more sound processing properties of the hearing device when the listening effort is determined to be false or being smaller, e.g., further depending on that the user is paying attention to one or more of the speech sources, at least to a certain degree, and/or that the user comprehends the speech in one or more of the speech signals, at least to a certain degree.

In some examples, the activating the one or more sound processing properties is based on the comprehension incapability state, which may be determined based on the listening effort and the listening state, e.g., based on the listening effort and the attentive uncomprehending listening state. In some instances, the operation includes activating the one or more sound processing properties of the hearing device when the comprehension incapability state indicates that user is uncapable to comprehend the speech, at least to a certain degree, and/or deactivating the one or more sound processing properties of the hearing device when the comprehension incapability state indicates that user is capable to comprehend the speech, at least to a certain degree.

Various embodiments will now be described in more detail with reference to the figures. The systems, hearing devices, and methods described herein may provide one or more of the benefits mentioned above and/or various additional and/or alternative benefits that will be made apparent herein. While embodiments for a hearing system configured to determine a listening state are described below, the described embodiments may further be configured to determine other conditions (e.g., comprehension, listening effort, etc.) of the user.

FIG. 1 shows an illustrative implementation 100 of a hearing system configured to determine a listening state of a user based on motion and/or own-voice of the user. As shown, implementation 100 includes a hearing device 102 communicatively coupled with a processing unit 104. Implementation 100 may include additional or alternative components as may serve a particular implementation.

Hearing device 102 may be implemented by any type of hearing device configured to enable or enhance hearing by a user wearing hearing device 102. For example, hearing device 102 may be implemented by a hearing aid configured to provide an amplified version of audio content to a user, a sound processor included in a cochlear implant system configured to provide electrical stimulation representative of audio content to a user, a sound processor included in a bimodal hearing system configured to provide both amplification and electrical stimulation representative of audio content to a user, or any other suitable hearing prosthesis.

As shown, hearing device 102 includes one or more input transducers 106 and an output transducer 110. In some examples, hearing device 102 may further include a motion sensor 108. Hearing device 102 may include additional or alternative components as may serve a particular implementation.

Input transducer 106 may include an electroacoustic transducer, e.g., a microphone. Microphone 106 may be implemented by one or more suitable audio detection devices configured to detect audio data representative of one or more audio signals presented to a user of hearing device 102. The one or more audio signals may include, for example, audio content (e.g., music, speech, noise, etc.) generated by one or more audio sources included in an environment of the user. Each microphone 106 may be included in or communicatively coupled to hearing device 102 in any suitable manner. Additionally or alternatively, input transducer 106 may include a radio frequency (RF) receiver configured to receive RF signals including audio data representative of one or more audio signals presented to the user of hearing device 102. For instance, the RF signals may be received in accordance with a Bluetooth™ protocol and/or by a mobile phone network such as 4G or 5G and/or by any other type of RF communication such as, for example, data communication via an internet connection and/or data communication at a frequency in a GHz range. The audio signal may include, for example, a phone call signal and/or a streaming signal which may be received while delivered from an audio provider, such as a phone call signal provider and/or a streaming media provider and/or may comprise a signal transmitted from an auxiliary device, e.g., a smartphone. Each RF receiver 106 may be included in hearing device 102 or communicatively coupled to hearing device 102 in any suitable manner.

The audio data detected and/or received by one or more input transducers 106 may include one or more speech signals representative of a speech from a one or more speech sources different from the user. E.g., the one or more speech signals may include a speech from a conversation partner in the user's environment, a speech from a conversation partner in a phone call, a speech from a chatbot, a speech in a media playback equipment such as a TV, a speech from a conversation partner in an audio or video communication platform, etc. In some examples, the one or more speech signals may be extracted and/or separated from the audio data, e.g. by a signal analysis performed on the audio data and/or by a machine learning (ML) algorithm configured to separate the one or more speech signals from the audio data.

Output transducer 110 may be implemented by any suitable audio output device, for instance a loudspeaker of a hearing device or an output electrode of a cochlear implant system. In some instances, the audio data detected by one or more input transducers 106 may include own voice data representative of an own-voice activity of the user. In some examples, the own voice data may be extracted and/or separated from the audio data, e.g. by a signal analysis performed on the audio data and/or by a machine learning (ML) algorithm configured to separate the own voice data from the audio data. Additionally or alternatively, one or more input transducers 106 may include an own-voice detector, e.g., a microphone and/or a motion sensor configured to pick up a bone conducted sound from the user's skull, an ear canal microphone, and/or the like. The own voice data may be representative of any sound produced by the user's vocal cords, e.g., speech, non-speech, paralinguistic expressions, laughter, giggling, moaning, monosyllabic and polysyllabic utterances, etc.

Motion sensor 108 may be implemented by one or more sensors configured to detect motion of hearing device 102 and output motion data representative of head movements of the user while wearing hearing device 102. For example, motion sensor 108 may include any suitable inertial sensor (e.g., an inertial measurement unit (IMU), an accelerometer, a gyroscope, etc.). While hearing device 102 is being worn by a user, the motion data output by motion sensor 108 of hearing device 102 may be representative of motion by the user, such as head movements (e.g., nodding, shaking, leaning, tilting, etc.) of the user.

Processing unit 104 may be implemented by one or more computing devices and/or computer resources (e.g., processors, memory devices, storage devices, etc.) as may serve a particular implementation. For example, processing unit 104 may be implemented by a mobile device, personal computer, and/or other computing device configured to be communicatively coupled (e.g., by way of a wired and/or wireless connection) to hearing device 102. As shown, processing unit 104 may include, without limitation, a memory 112 and a processor 114 selectively and communicatively coupled to one another. Memory 112 and processor 114 may each include or be implemented by computer hardware that is configured to store and/or process computer software. Various other components of computer hardware and/or software not explicitly shown in FIG. 1 may also be included within processing unit 104. In some examples, memory 112 and/or processor 114 may be distributed between multiple devices and/or multiple locations as may serve a particular implementation.

Memory 112 may store and/or otherwise maintain executable data used by processor 114 to perform any of the functionality described herein. For example, memory 112 may store instructions 116 that may be executed by processor 114. Memory 112 may be implemented by one or more memory or storage devices, including any memory or storage devices described herein, that are configured to store data in a transitory or non-transitory manner. Instructions 116 may be executed by processor 114 to cause processing unit 104 to perform any of the functionality described herein. Instructions 116 may be implemented by any suitable application, software, code, and/or other executable data instance. Additionally, memory 112 may also maintain any other data accessed, managed, used, and/or transmitted by processor 114 in a particular implementation.

Processor 114 may be implemented by one or more computer processing devices, including general purpose processors (e.g., central processing units (CPUs), digital signal processors (DSPs), graphics processing units (GPUs), microprocessors, etc.), special purpose processors (e.g., application specific integrated circuits (ASICs), field-programmable gate arrays (FPGAs), etc.), image signal processors, or the like. Using processor 114 (e.g., when processor 114 is directed to perform operations represented by instructions 116 stored in memory 112), processing unit 104 may perform various operations as described herein.

In some instances, implementation 100 may include an additional one or more sensors such as for determining one or more additional conditions of the user. For example, implementation 100 may include a physiological sensor, e.g., a heart rate sensor and/or a blood pressure sensor. The heart rate sensor that may be implemented by any suitable sensor configured to detect a heart rate of the user and output heart rate data representative of one or more heart rate values of the user. Additionally, or alternatively, implementation 100 may include a blood pressure sensor that may be implemented by any suitable sensor configured to detect a blood pressure of the user and output blood pressure data representative of one or more blood pressure values of the user. To illustrate, the heart rate sensor and/or the blood pressure sensor may include an optical sensor (e.g., a photoplethysmography (PPG) sensor) and/or an electrical sensor (e.g., an electrocardiogram (ECG) sensor).

Additionally or alternatively, implementation 100 may include other suitable sensors (e.g., cameras, eye trackers, physiological sensors including bioelectric sensors such as electroencephalogram (EEG) sensors, electrooculography (EOG) sensors, etc.) configured to detect one or more characteristics (e.g., eye movements, facial expressions, body language, brain activity, etc.) of the user and/or the environment (e.g., one or more third parties speaking to the user). In some examples, the one or more additional sensors are included in hearing device 102 (e.g., to position at least a portion of the heart rate sensor and/or blood pressure sensor in sufficient contact with the user for generating heart rate data and/or blood pressure data). The one or more additional sensors may additionally or alternatively be included in a different wearable device separate from hearing device 102 (e.g., a watch or a mobile device worn or carried by the user). In these alternative configurations, hearing device 102 may access data generated by the one or more additional sensors by being communicatively coupled to the different device.

Figure 2:
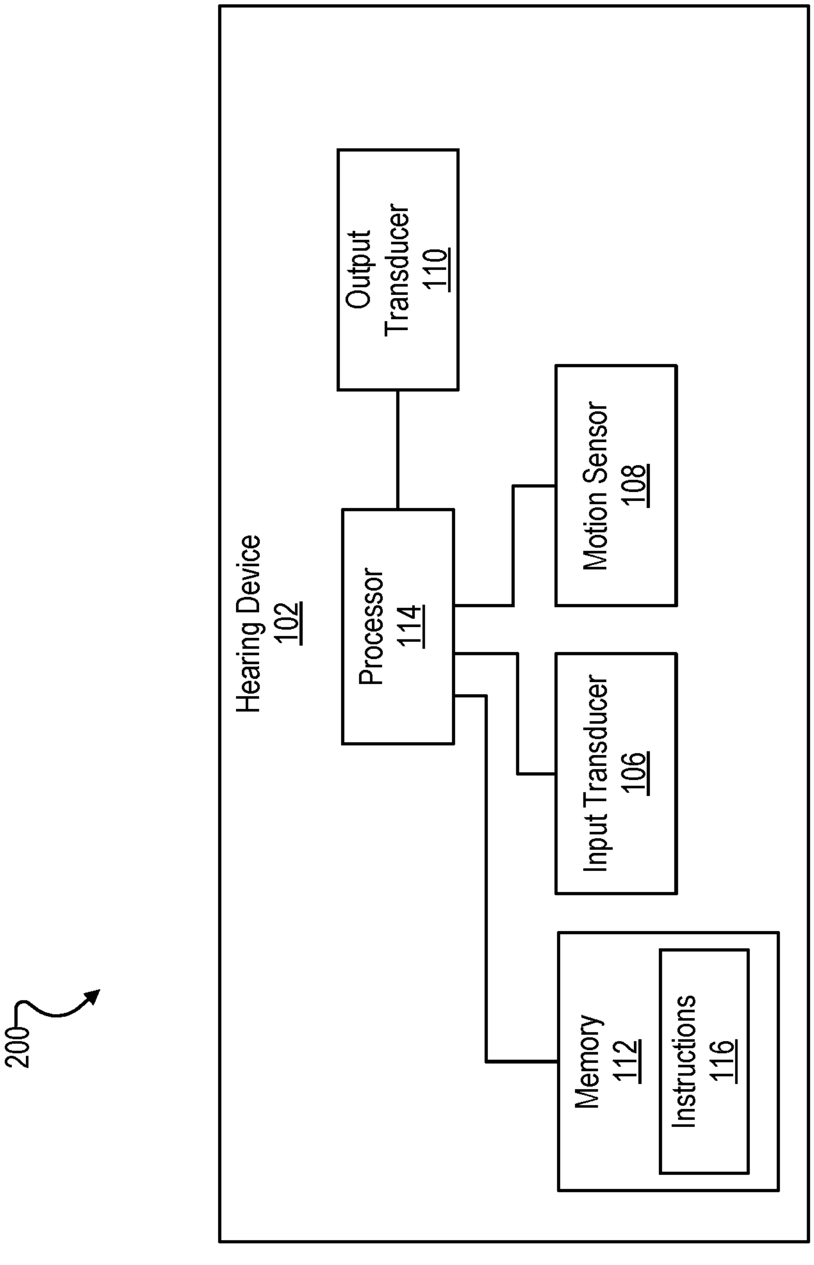
FIG. 2 shows another illustrative implementation of a hearing system.

FIG. 2 shows another illustrative implementation 200 of a hearing system configured to determine a listening state of a user based on motion and/or own-voice of the user. As shown, implementation 200 is similar to implementation 100, except that implementation 200 includes processor 114 and memory 112 located within hearing device 102. Implementation 200 may include additional or alternative components as may serve a particular implementation.

Figure 3:
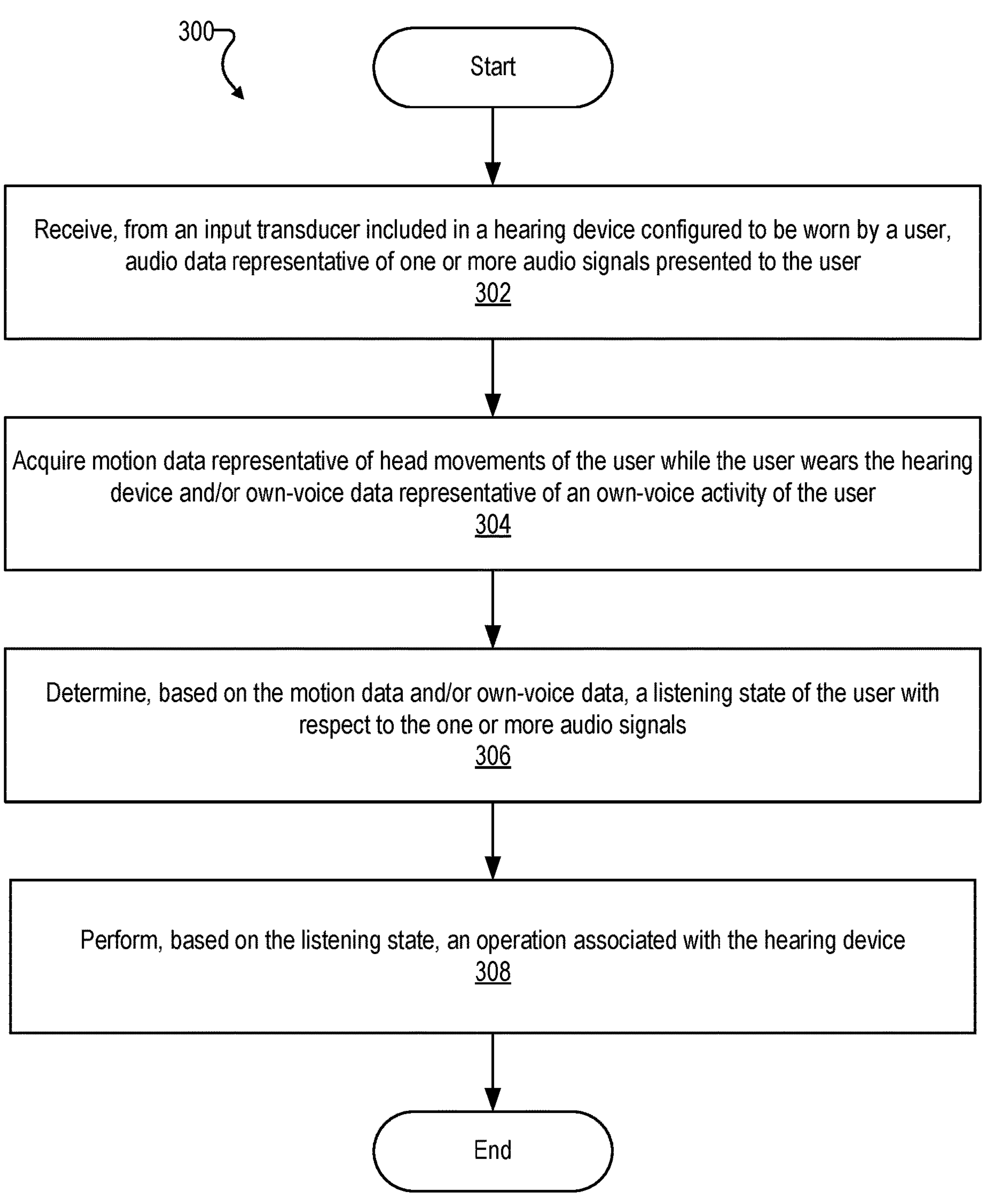
FIG. 3 shows an illustrative method of operating a hearing system.

FIG. 3 shows an illustrative method 300 that may be performed by a hearing system according to the principles described herein. While FIG. 3 illustrates exemplary operations according to one embodiment, other embodiments may omit, add to, reorder, and/or modify any of the operations shown in FIG. 3. Moreover, each of the operations depicted in FIG. 3 may be performed in any of the ways described herein.

As shown, a hearing system may, at operation 302, receive, from one or more input transducers included in the hearing device, audio data representative of one or more audio signals presented to the user. The audio data may include one or more speech signals representative of a speech from one or more speech sources different from the user. In some examples, the one or more audio signals may comprise one or more speech signals including, e.g., one or more of: verbal communication (e.g., speech) from one or more third parties (e.g., in-person and/or remotely, such as using a phone, videoconferencing, etc.), or communication (e.g., verbal communication, music, etc.) from a device (e.g., a virtual assistant device, a television, a smartphone, a chatbot, etc.). In some examples, the audio data may further include one or more other audio signals, e.g., one or more music signals representative of music (e.g., live music and/or streamed music content) and/or one or more environmental sound signals representative of sound in the environment of the user. In some examples, the one or more audio signals may further include own voice data representative of an own-voice activity of the user, for example verbal backchannels or interjections from the user (e.g., speech), non-verbal backchannels or interjections (e.g., laughter, gasps, sighs, etc.) from the user, etc.

In some examples, a presence of the one or more speech signals in the audio data may be determined, and subsequent operations may be performed depending on whether one or more of the speech signals are contained in the audio data. In some examples, one or more of the speech signals may be extracted and/or separated from the audio data, e.g. by a signal analysis performed on the audio data and/or by an ML algorithm configured to separate the one or more speech signals from the audio data. In some examples, a characteristic of the one or more speech signals may be determined, and subsequent operations may be performed depending on whether the characteristic fulfills a predetermined property. The property may comprise, e.g., that one or more of the speech signals are characteristic for a particular voice, e.g., a voice of a significant other or an unidentified person, for a local proximity of a conversation partner, for a certain orientation of the conversation partner relative to the user, etc.

The hearing system may, at operation 304, acquire motion data representative of head movements of the user while the user wears the hearing device. The motion data may be received from a motion sensor included in the hearing device. In some examples, the head movements may include one or more of: head nodding (e.g., nonconscious, involuntary, or to indicate approval), head shaking (e.g., to indicate disapproval), head tilting (e.g., to indicate thought), or head leaning (e.g., toward one or more of the speech signals). Additionally, the motion data may include one or more characteristics (e.g., a frequency, a direction, a magnitude, an acceleration, a duration, etc.) of the head movements.

Additionally or alternatively, the hearing system may, at operation 304, acquire, own-voice data representative of an own-voice activity of the user. The own-voice data may be included in the audio data received from the one or more input transducers. In some examples, the own-voice data may be extracted and/or separated from the audio data, e.g. by a signal analysis performed on the audio data and/or by an ML algorithm configured to separate the own-voice data from the audio data. In some examples, the own-voice data may be received from an own-voice detected implemented as one or more of the input transducers. In some examples, the own-voice of the user may include verbal backchannels, e.g., interjections, from the user to the speech (e.g., speech, repeats, reformulations, responses, follow-up questions, paraphrasing, and acknowledgements) and/or non-verbal backchannels, e.g., interjections, from the user to the speech (e.g., laughter, gasps, sighs, giggling, moaning, paralinguistic expressions, and monosyllabic utterances).

In some implementations, the hearing system may further receive data from one or more additional sensors, such as one or more of: physiological data indicative of a physiological property of the user, e.g., heart rate data representative of one or more heart rate values of the user (e.g., from a heart rate sensor) or blood pressure data representative of one or more blood pressure values of the user (e.g., from a blood pressure sensor), or additional motion data representative of other motion (e.g., eye movements, facial expressions, body language, etc.) of the user.

The hearing system may, at operation 306, determine, based on at least one of the motion data and the own voice data, a listening state of the user with respect to the one or more speech signals. For example, the listening state may comprise information about whether or to which degree the user is paying attention to one or more of the speech sources (e.g., irrespective of whether or not the user comprehends the speech), which may be denoted as a paying attention indicator, and/or information about whether or to which degree the user comprehends the speech, e.g., the speech contained in one or more of the speech signals and/or the speech provided from one or more of the speech sources, which may be denoted as a comprehension indicator.

In some examples, the paying attention indicator may comprise information about whether or to which degree the user is paying attention to the one or more speech sources, e.g., a likelihood thereof or a binary value (such as true or false), with or without comprehending the speech. To illustrate, when the user is paying attention to a conversation partner, the user's behavior may exhibit a certain type of dyadic and/or social interaction with the conversation partner irrespective of whether the user comprehends the speech or not. This may include a behavior of the user coherent with a behavior of the conversation partner, e.g., a mimicry of movements performed by the conversation partner and/or a corresponding movement following a leading movement of conversation partner. E.g., such behavior may be implemented in mirror neuron systems of the user. This may also imply a behavior decoupled from the behavior of the conversation partner, e.g., a complementary behavior such as nodding to formally indicate an agreement with the conversation partner. Head movements performed by the user in such a dyadic and/or social interaction with the conversation partner, irrespective of speech comprehension, may be voluntary (e.g., including an activation of the user's mirror neuron systems) and/or slow (e.g., within a frequency range of 0.1 Hertz to 2 Hertz) and/or may lag behind a leading head movement behavior of the conversation partner (e.g., by a constant lag in the hundred milliseconds range).

The paying attention to a conversation partner may further imply certain non-verbal backchannels (e.g., interjections) to the speech in the user's own-voice, e.g., paralinguistic expressions such as laughter or back-channels such as "uh-huh," "hm," "um", "sigh", "gasp", which may be uttered by the user during occurrences of the speech and/or during speech pauses. This may also imply certain verbal backchannels (e.g., interjections) to the speech in the user's own-voice, e.g., repeats, reformulations, follow-up questions, paraphrasing, or acknowledgments (e.g., "yeah," "right," "okay", etc.). Backchannels expressed by the user in such a dyadic and/or social interaction with the conversation partner, which are irrespective of speech comprehension, may be less complex and/or rather short and/or of a more simplistic type as compared to backchannels which are in response to a speech which has been comprehended by the user.

The paying attention to a conversation partner may further imply certain eye movements or gazes of the user relative to the speech source, e.g., gazing in a direction of the conversation partner and/or repeatedly looking in a particular direction with periods of deflected gazes in between.

The comprehension indicator may comprise information about whether or to which degree the user comprehends the speech, e.g., a likelihood thereof or a binary value (such as true or false). To illustrate, when the user comprehends the speech of a conversation partner, the user may exhibit a behavior differing from and/or going beyond the above described behavioral information allowing to identify a behavior in which the is user paying attention to the conversation partner, e.g., in a dyadic and/or social interaction and/or irrespective of speech comprehension. For example, when the user is paying attention to the conversation partner but does not comprehend the speech content or only part of the speech content, the user's behavior in reaction to the speech may lack one or more features which are typical for speech comprehension.

Those features typical for speech comprehension may imply head movements performed by the user which are differing from and/or going beyond head movements mimicking the conversation partners gestures, e.g., to socially convey interest or participation to the conversation partner, and/or head movements performed by the user which are voluntary and/or slow. In particular, head movements performed by the user which can be typical for speech comprehension may be characterized as non-mimicking movements of a leading behavior of the conversation partner, e.g., in that they are significantly more often observable in the user's behavior as compared to the conversation partner's behavior during his speech. Those findings are supported by Hale et al. (Hale, J., Ward, J. A., Buccheri, F., Oliver, D., & Hamilton, A., 2020, Are you on my wavelength? Interpersonal coordination in dyadic conversations, J. Nonverbal Behavior, 44:63-83). For example, the head movements performed by the user typical for speech comprehension may be in a range of a frequency of the speech. As another example, head movements typical for speech comprehension may be involuntary (e.g., going beyond a behavior controlled by mirror neuron systems to provide for social mimicking) and/or fast (e.g., within a frequency range of 2 Hertz to 6.5 Hertz, or higher) and/or may be substantially synchronous with the speech (e.g., with regard to a phase difference).

Those features may also imply backchannels (e.g., interjections) in the user's own-voice fulfilling a property which is typical for speech comprehension, e.g., with regard to a complexity and/or length and/or type of the backchannel.

For example, backchannels exceeding a threshold of a certain complexity and/or length and/or a certain type of backchannels (e.g., repetitions of the speech, in particular repetitions exceeding a minimum length and/or complexity) may indicate the user's speech comprehension, wherein backchannels below the threshold of complexity and/or length and/or of a different type may be indicative of the user paying attention to conversation partner but may not be conclusive with regard to speech comprehension.

In some examples, the paying attention indicator may comprise information about whether or to which degree the user is paying attention to the one or more speech sources including the information about whether or to which degree the user comprehends the speech. For example, an informational content of the paying attention indicator with respect to the user paying attention to the one or more speech sources with or without comprehending the speech may thus be enhanced. In some instances, the information may comprise information about the head movements performed by the user which are voluntary and/or slow (e.g., within a frequency range of 0.1 Hertz to 2 Hertz) and/or lag behind a leading head movement behavior of the conversation partner, and information about the head movements performed by the user which are involuntary and/or fast (e.g., within a frequency range of 2 Hertz to 6.5 Hertz, or higher) and/or may be substantially synchronous with the speech. E.g., such information may comprise information about head movements occurring at least partially within a frequency range of 0.1 Hertz to 6.5 Hertz, or higher (such as at least partially within an extended frequency range of 0.5 Hertz to 12 Hertz). In some instances, the information may comprise information about the backchannels to the speech in the user's own-voice which are fulfilling a property which is at least not fully conclusive for speech comprehension (e.g., backchannels below a threshold of a certain complexity and/or length and/or a certain type of backchannels inconclusive of speech comprehension), and backchannels which are fulfilling a property which is conclusive of speech comprehension (e.g., backchannels exceeding a threshold of a certain complexity and/or length and/or a certain type of backchannels conclusive of speech comprehension).

To illustrate, there can be various reasons when the user is paying attention to a speech source, at least to a certain degree, without comprehending the speech, at least to a certain degree. One of the reasons may include a lacking intention of listening by the user, e.g., when the user is not interested in a content of the speech or otherwise distracted. Another reason may include a problem with the user's hearing, e.g., due to a hearing loss and/or environmental sound disturbances, and/or a problem with the user's listening capabilities, e.g., due to a cognitive impairment and/or language barriers. In some of those cases, the user may not comprehend the speech even when having a listening intention and/or when investing a listening effort. Despite those reasons, the user may often pretend to listen to the speech at least by formally paying attention to the conversation partner, e.g., in the form of the above described dyadic and/or social interactions.

In some examples, the paying attention indicator may comprise information about whether or to which degree the user is paying attention to the one or more speech sources including information contained in the comprehension indicator about whether or to which degree the user comprehends the speech. In some examples, the paying attention indicator may comprise information about whether or to which degree the user is paying attention to the one or more speech sources excluding information contained in the comprehension indicator about whether or to which degree the user comprehends the speech.

In some implementations, determining the listening state may be employed to identify the user's listening intention and/or a problem with the user's hearing and/or listening capabilities and/or a listening effort of the user. Further, in a case multiple speech sources are present in the user's environment, the listening state may be employed to identify a speech source of interest for the user. E.g., based on the one or more speech signals, a direction of arrival (DOA) of the speech may be determined to locate the speech source of interest. In some examples, based on the DOA of the speech from the speech source of interest, a sound processing performed by the hearing device may be advantageously adjusted.

In some examples, the listening state may be based on whether the user is paying attention to an audio source, actively listening to and/or is intending to listen to the one or more audio signals presented to the user In some examples, the listening state may include at least one of an inattentive uncomprehending listening state (which may also be denoted as a not-listening state), an attentive uncomprehending listening state, and a comprehending listening state. The inattentive uncomprehending listening state may be indicative of, e.g., based on the paying attention indicator and the comprehension indicator, whether or to which degree the user is neither paying attention to the one or more speech sources nor comprehending the speech, e.g., in one or more of the speech signals. The attentive uncomprehending listening state may be indicative of, e.g., based on the paying attention indicator and the comprehension indicator, whether or to which degree the user is paying attention to the one or more speech sources but not comprehending the speech, e.g., in one or more of the speech signals. The comprehending listening state may be indicative of, e.g., based on the comprehension indicator or based on the paying attention indicator and the comprehension indicator, whether or to which degree the user is comprehending the speech, e.g., with or without paying attention to the one or more speech sources. In some examples, the listening state may be determined as a degree (e.g., an extent or a likelihood) to which the user is exhibiting the respective behavior. In some examples, the listening state may be determined as a binary value (e.g., true or false) indicating whether the user is exhibiting the respective behavior.

In an illustrative example, the inattentive uncomprehending listening state may be determined as true or having a rather large degree when the user is not paying attention to a speech source, not actively listening to and thus not comprehending and does not intend to listen to the speech (e.g., the user is focusing on work or is reading a book while being unencumbered by the acoustic surroundings). In another example, the attentive uncomprehending listening state (which may also be denoted as a paying-attention-without-understanding state) may be determined as true or having a rather large degree when the user is paying attention to a speech source but is not listening to and thus not comprehending and/or does not intend to listen to, or is only pretending to listen, or is listening but not able to understand, the speech in the one or more audio signals (e.g., the user is looking at a third party speak and pretending to listen, e.g., by expressing a dyadic and/or social interaction with the conversation partner, but not actually listening, such as to convey sympathy, without the intent of understanding the speech, or the user is attempting to understand a third party but unsuccessfully so). In a further example, the comprehending listening state may include a comprehending listening state, such as when the user is paying attention to an audio source, is actively listening to, is understanding and does intend to listen to the speech in the one or more audio signals (e.g., the user is having a conversation with a third party on a noisy train).

In some implementations, the determining the listening state may include classifying the listening state as one or more of an inattentive uncomprehending listening state (or not-listening state), an attentive uncomprehending listening state (or paying-attention-without-understanding listening state), and a comprehending listening state (or active listening state). In some examples, classifying the listening state may include determining a degree (e.g., an extent and/or a likelihood) to which at least one of the inattentive uncomprehending listening state, the attentive uncomprehending listening state, and the comprehending listening state occurs. In some examples, the listening state may be determined, e.g., selected, as a single one of one or more of the inattentive uncomprehending listening state, the attentive uncomprehending listening state, and the comprehending listening state, for instance depending on the degree, e.g., the highest likelihood, of its occurrence.

In some implementations, the motion data and/or own-voice data is input into a model which outputs the listening state, wherein the model is configured to determine whether or to what degree the input matches a predetermined pattern indicative of the listening state. The model may be trained and/or updated with motion data and/or own-voice data collected from the user. E.g., the model may be implemented as a machine learning (ML) algorithm outputting a likelihood of one or more of the inattentive uncomprehending listening state, the attentive uncomprehending listening state, and the comprehending listening state. In some examples, the model may be adapted to an individual user based on the motion data and/or own-voice data acquired when the hearing device is worn by the user. E.g., an ML algorithm may be trained based on the acquired motion data and/or own-voice data, which may be labelled with a corresponding listening state, e.g., a currently occurring listening state, of the user. To illustrate, a current listening state may be determined, e.g., by the ML algorithm and/or by an input of the user, and one or more characteristics of the acquired motion data and/or own-voice data may be extracted to perform or refine the training of the ML algorithm, e.g., by labelling the characteristics with the current listening state to obtain training data for training the ML algorithm.

The determining the listening state of the user may be based on the head movements of the user, such as one or more of: a frequency of the head movements, a direction of the head movements, a magnitude of the head movements, an acceleration of the head movements, timing of the head movements and/or a duration of the head movements. To illustrate, head movements within a specific frequency range, e.g., with a characteristic magnitude, acceleration, particular or synchronized timing and/or duration of head movements may indicate that the user is comprehending the speech, e.g., by actively and/or intently listening to the speech contained in one or more of the speech signals. Alternatively, head movement outside of a specific frequency range, e.g., with a different magnitude, acceleration, and/or duration of head movements may indicate that the user is not actively and/or not intently listening to the speech in one or more of the speech signals, thus not comprehending the speech. Moreover, head movements in a direction toward the speech source may indicate that the user is comprehending the speech by actively and/or intently listening to the speech in one or more of the speech signals, while no head movements and/or head movements in a direction away from one or more of the speech signals or without any synchronicity to the speech signal may indicate that the user is not comprehending and/or actively and/or not intently listening to the speech contained in one or more of the speech signals.

In some implementations, the determining the listening state may include determining that the user comprehends the speech, e.g., is in a comprehending listening state, when the frequency of the head movements is within a predetermined frequency range representative of the speech comprehension. This may include head movements which are involuntary and/or fast. For example, in some scenarios, a user may exert fast head movements larger than 2 Hertz (Hz) (in some examples larger than 3 Hz or 4 Hz and/or in some examples head movements in a frequency range comprising frequencies between 2 Hz and 6.5 Hz and/or in some examples in a frequency range comprising frequencies between 2 Hz and 5 Hz, which may, e.g., correspond to a rate at which syllables occur in speech and thus may account for a synchronization of the head movements with the speech), such as head movements that may be involuntary to the user or unconsciously executed by the user when the user is comprehending the speech by actively and intently listening (e.g., during a conversation). Accordingly, head movements that are within a predetermined frequency range may indicate that the user is in a comprehending listening state, e.g., an active listening state in which paying attention to the one or more speech sources may also lead to successfully comprehending the speech. The predetermined frequency range representative of the speech comprehension may comprise a frequency bandwidth including a frequency of 2 Hz or larger and/or 6.5 Hz or smaller. In some instances, the frequency range representative of the speech comprehension may have a lower limit of at least 2 Hz (e.g., 3 Hz, or 4 Hz, or 5 Hz). In some instances, the frequency range representative of the speech comprehension may also have an extended lower limit which may be smaller than 2 Hz (e.g., 1 Hz, or 1.5 Hz). In some instances, the frequency range may also have an upper limit, e.g., 12 Hz, or 10 Hz, or 8 Hz, or 7 Hz, or 6 Hz, or 5 Hz. In some illustrative examples, the frequency range representative of the speech comprehension may be from 2 Hz to 6.5 Hz, or from 2 Hz to 5 Hz.

In some instances, the determining that the user comprehends the speech, at least to a certain degree, e.g., whether or to which degree the user is in the comprehending listening state (or in an active listening state), may be further based on a proportion of time during which the head movements are within the frequency range representative of the speech comprehension while the one or more speech signals are presented to the user. In some examples, this may correspond to a proportion of time during which the fast head movements, e.g., within the frequency range from 2 Hz to 6.5 Hz, exceed a predetermined magnitude threshold which may be representative of magnitudes of head movements during speech comprehension. As an illustrative example, a greater proportion and/or duration of fast head movements during the speech in the one or more speech signals may indicate a higher degree of speech comprehension (which may further imply, e.g., a higher listening activity, a greater intention to listen, and/or a more successful listening when trying to listen) while a lower proportion and/or duration of fast head movements during the speech in one or more of the speech signals may indicate a lower degree of speech comprehension (which may further imply paying attention without understanding and/or without an intent to listen).

Still other suitable configurations for determining the listening state based on head movements of the user may be used.

In some implementations, the determining the listening state may include determining that the user is paying attention to the one or more speech sources, at least to a certain degree, when the frequency of the head movements is within a predetermined frequency range representative of the user paying attention to the one or more speech sources. This may imply head movements which are voluntary and/or slow, e.g., head movements performed by the user in a dyadic and/or social interaction with the conversation partner such as mimicry or complementary behavior, for instance within a frequency range of 0.1 Hz to 2 Hz, e.g., between 0.2 Hz and 1.1 Hz, or between 0.5 Hz and 1.9 Hz. In some examples, the frequency range representative of the user paying attention to the one or more speech sources comprises smaller frequencies than the frequencies contained in the frequency range representative of the speech comprehension. The frequency range representative of paying attention to the one or more speech sources may comprise a frequency bandwidth including frequencies smaller than 2 Hz, e.g., 1.5 Hz, or 1.1 Hz, or 1 Hz, or smaller.

In some implementations, the predetermined frequency range representative of paying attention to the one or more speech sources may be selected to be representative of the user paying attention to the one or more speech sources without information about whether the user comprehends the speech, e.g., restricted to the head movements which are voluntary and/or slow. In some instances, an upper limit of this frequency range may be 2 Hz, or smaller than 2 Hz, e.g., 1.5 Hz, or 1.1 Hz. In some illustrative examples, the frequency range may be from 0.1 Hz to 2 Hz, or from 0.5 Hz to 2 Hz, or from 0.2 Hz to 1.1 Hz, or from 0.5 Hz to 1.1 Hz.

In some implementations, the predetermined frequency range representative of paying attention to the one or more speech sources may be selected to be representative of paying attention to the one or more speech sources including information about whether the user comprehends the speech, e.g., by also including frequencies of head movements which are involuntary and/or fast. In some illustrative examples, such a frequency range may be from 0.1 Hz to 12 Hz, or from 0.5 Hz to 12 Hz, or from 0.1 Hz to 6.5 Hz, or from 0.2 Hz to 5 Hz.

In some implementations, the determining the listening state may include determining a proportion of the head movements having a frequency within the frequency range representative of the speech comprehension and the head movements having a frequency within the frequency range representative of the user paying attention to the one or more speech sources. In some instances, the proportion may be indicative of whether the user is paying attention to the one or more speech sources without comprehending the speech, e.g., whether or to which degree the user is in the attentive uncomprehending listening state. To illustrate, the determining that the user is in the attentive uncomprehending listening state may be based on the proportion of voluntary and/or slow (i.e., within the range of 0.2 Hz to 2 Hz) to involuntary and/or fast head movements (within the range of 2 Hz to 6.5 Hz) while the one or more audio signals are presented to the user. As an illustrative example, a greater proportion of voluntary and/or slow head movements as compared to involuntary and fast head movements during the speech in the one or more audio signals may indicate paying attention to the one or more speech sources without comprehending the speech, such as when pretending to listen while not listening or attempting to understand the speech of a conversation partner while failing at understanding.

In some instances, the determining the listening state may include determining that the user is neither paying attention to the one or more speech sources, at least to a certain degree, nor comprehending the speech, at least to a certain degree, e.g., whether or to which degree the user is in the uncomprehending inattentive listening state, based on a property of the motion data in the frequency range representative of the user paying attention to the one or more speech sources, and/or based on a property of the motion data in the frequency range representative of the speech comprehension. In some examples, the property may be based on a magnitude of the head movements, e.g., the magnitude of voluntary and slow (i.e., within the range of 0.2 Hz to 2 Hz) and/or on the magnitude of involuntary and fast head movements (i.e., within the range of 2 Hz to 6.5 Hz) while the one or more audio signals are presented to the user. If the magnitudes of slow and/or fast head movements do not exceed respective magnitude thresholds that are representative of magnitudes of head movements during conversations, the listening state may be determined as inattentive uncomprehending listening.

For example, the determining the listening state may include determining that the user comprehends the speech, at least to a certain degree, e.g., whether or to which degree the user is in the comprehending listening state (or active listening state) when a frequency of the head movements corresponds to a frequency of the speech in the one or more speech signals. As an illustrative example, the user may exert head movements that mimic the frequency of the one or more speech signals during a conversation. Such head movements that correspond to the frequency of the one or more speech signals may indicate that the user comprehends the speech and/or is actively and/or intently listening to the speech in one or more of the speech signals.

In some implementations, the determining whether or to which degree the user is in a comprehending listening state and/or attentive uncomprehending listening state and/or a inattentive uncomprehending-listening state and/or has no intention to listen to the speech, may be based on a property of the head movements, e.g. a magnitude of the head movements, in the frequency range representative of the speech comprehension, e.g., between 2 Hz and 6.5 Hz, or within a wider frequency range between 0.5 Hz and 12 Hz.

In some implementations, the determining the listening state may include determining that the user comprehends the speech, at least to a certain degree, e.g., whether or to which degree the user is in the comprehending listening state, based on one or more backchannels (e.g., interjections) to the speech contained in the own-voice data fulfilling a predetermined property representative of the speech comprehension. In some instances, the property of the backchannels in the own-voice data may comprise at least one of a length, a complexity, a number, and a type of the backchannels. In some examples, the backchannels may comprise non-verbal backchannels, such as paralinguistic expressions, and verbal backchannels. In some instances, the backchannels may be compared relative to a threshold of the property, e.g., a minimum complexity and/or length and/or number. Backchannels exceeding the threshold may indicate the user comprehending the speech. In some instances, the backchannels may be evaluated relative to a type of backchannels which is characteristic for speech comprehension (e.g., repetitions of the speech, characteristic semantic structures, a vocal pitch, etc.).

In some implementations, the determining the listening state may include determining that the user is paying attention to the one or more speech sources, at least to a certain degree, based on one or more backchannels (e.g., interjections) to the speech contained in the own-voice data fulfilling a predetermined property representative of the user paying attention to the one or more speech sources. In some instances, the property of the backchannels in the own-voice data may comprise a presence of any backchannel (e.g., paralinguistic expressions and/or verbal backchannels) in the own-voice data. In some instances, the property of the backchannels in the own-voice data may comprise at least one of a length, a complexity, a number, and a type of the backchannels. In some examples, a required length and/or complexity and/or number of the backchannels representative of the user paying attention to the one or more speech sources may be reduced as compared to the length and/or complexity and/or number of the backchannels representative of the user comprehending the speech. In some instances, the backchannels may be compared relative to a threshold of the property, e.g., a minimum complexity and/or length, wherein the threshold of the property representative of the user paying attention to the one or more speech sources is smaller than the threshold of the property representative of the speech comprehension. In some instances, the backchannels may be evaluated relative to a type of backchannels which is characteristic for the user paying attention to the one or more speech sources (e.g., a dictionary of empty phrases, flowers of speech, platitudes, paralinguistic expressions, etc.), which may be different and/or extended and/or more extensive relative to the type of backchannels which is characteristic for speech comprehension.

In some implementations, the determining the listening state may include determining a proportion of the one or more backchannels fulfilling the property representative of the speech comprehension and one or more backchannels fulfilling a property representative of the user paying attention to the one or more speech sources. In some examples, the proportion may be indicative of whether the user is paying attention to the one or more speech sources without comprehending the speech, e.g., whether or to which degree the user is in the attentive uncomprehending listening state. As an illustrative example, a smaller proportion of backchannels fulfilling the property representative of the speech comprehension as compared to the backchannels fulfilling the property representative of paying attention to the one or more speech sources during the speech may indicate paying attention to the one or more speech sources without comprehending the speech, at least to a certain degree.

In some implementations, a greater number of verbal interjections by the user relative to a number of non-verbal interjections by the user (e.g., in response to a speaker) may indicate that the user is comprehending the speech and/or actively and/or intently listening, while a lower number of verbal interjections to the number of non-verbal interjections may indicate that the user is paying attention without comprehending, e.g. without an intent of understanding (e.g., the user is conveying sympathy to the speaker) or attempting to understand without succeeding at it.

In instances where the hearing system includes one or more additional sensors, the determining the listening state may be further based on data received from the one or more additional sensors. The data may be representative of one or more of: a heart rate of the user, a blood pressure of the user, eye movements of the user, facial expressions of the user, body language of the user, verbal interjections of the user, non-verbal interjections of the user, or brain activity of the user. To illustrate, facial expressions (e.g., smiling, frowning, etc.) and/or eye movements (e.g., gazing toward one or more of the speech sources, e.g., a DOA of one or more of the speech signals) during the one or more audio signals may indicate that the user is comprehending the speech and/or actively and/or intently listening. Additionally or alternatively, body language (e.g., leaning toward one or more of the speech sources, e.g., a DOA of one or more of the speech signals) during the one or more audio signals may indicate that the user is actively and/or intently listening. In some implementations, the hearing system may receive the data and/or cause the one or more additional sensors to generate the data in response to the head movements within the frequency range representative of the speech comprehension and/or within the frequency range representative of the user paying attention to the one or more speech sources.

Additionally or alternatively, the determining the listening state may be further based on determining a direction of one or more of the speech signals relative to the user (e.g., a DOA) and/or a proximity of one or more of the speech sources relative to the user. In some examples, the direction of the one or more speech signals and/or proximity of the one or more speech sources may be determined using a plurality of microphones included in the hearing system. E.g., the hearing system may include a hearing device having one microphone worn in each ear of the user, or the hearing system may include a hearing device having two or more microphones worn in one or both ears of the user. A difference between an intensity and/or a time that each microphone detects the one or more audio signals may be used to determine a direction of the one or more speech signals and/or proximity of the one or more speech sources. As an illustrative example, an audio signal that is detected by a microphone included in a hearing device worn in a right ear of the user prior to being detected by a microphone included in a hearing device worn in a left ear of the user may indicate that a source of the audio signal, e.g., a speech source, is located towards a right side of the user. As another example, an audio signal having a higher intensity may indicate that a source of the audio signal may be proximate to the user, while an audio signal having a lower intensity may indicate that a source of the audio signal may be located away from the user. In some instances, when the user is looking toward the direction of the one or more audio signals containing the speech and/or the user is closer to the one or more audio signals containing the speech, the user may be more likely to pay attention to the one or more speech sources and/or comprehend the speech and/or actively and/or intently listen to the speech contained in the one or more audio signals. Alternatively, when the user is looking away from the direction of the one or more audio signals containing the speech and/or the user is farther from the one or more audio signals containing the speech, the user may be less likely to pay attention to the one or more speech sources and/or comprehend the speech and/or actively and/or intently listen to the speech.

In some implementations, the determining the listening state includes determining a listening intention of the user, e.g., based on the information about whether or to which degree the user is paying attention to one or more of the speech sources; and/or the information about whether or to which degree the user comprehends the speech in one or more of the speech signals. The listening intention may be indicative of whether or to which degree the user intends to listen to the speech in one or more of the speech signals. To illustrate, when the listening state indicates that the user is neither paying attention to one or more of the speech sources, nor comprehending the speech, the listening intention may be determined to be not true (e.g., false), or to have a rather small degree. As another example, when the listening state indicates that the user comprehends the speech, at least to a certain degree, the listening intention may be determined to be true, or to have a rather large degree.

Additionally or alternatively, the determining the listening state may include comparing data (e.g., motion data and/or own-voice data and/or data received from the one or more additional sensors) to a model including data representative of one or more listening characteristics (e.g., head movements, heart rate values, blood pressure values, eye movements, facial expressions, body language, verbal interjections, non-verbal interjections, etc.) of the user (e.g., in various listening states). For example, the determining the listening state may include comparing a frequency of the head movements with reference data included in the model and representative of predetermined head movement frequencies for active and/or attentive listening. Such reference data may be based on previous frequencies of head movements by the user and/or other users. The reference data may further include other suitable listening characteristics of the user and/or other users indicative of active and/or attentive listening. In some examples, the reference data may be stored by the hearing system (e.g., in memory 112). In some implementations, the model may be configured to determine whether or to what degree the input matches a predetermined pattern indicative of the listening state.

In some implementations, the comparing the data to the model may further include implementing and applying artificial intelligence algorithms, such as machine learning (ML) algorithms, to determine the listening state of the user. E.g., the model may be implemented as an ML algorithm outputting a likelihood of one or more of the inattentive uncomprehending listening state, the attentive uncomprehending listening state, and the comprehending listening state. E.g., an identified type and/or frequency of head movements and/or an identified property of backchannels in the own voice data may be used to associate the head movements with a listening state of the user (e.g., based on known or previous listening states of the identified head movements and/or backchannels). Any suitable form of artificial intelligence and/or machine learning may be used, including, for example, deep learning, neural networks, etc. For example, a machine learning algorithm may be generated through machine learning procedures and applied to identification operations.

Additionally or alternatively, the determining the listening state may be based on a user input designating the listening state of the user. The user may designate the listening state by way of a user interface (not shown). The hearing system (e.g., processor 114) may be communicatively coupled (e.g., by way of a wired and/or wireless connection) with the user interface. In some implementations, the user interface may be included in the hearing device and/or a different wearable device separate from the hearing device (e.g., a watch or a mobile device worn or carried by the user) to receive a user input from the user interface. Additionally or alternatively, the user may provide a voice input by vocalizing the listening state of the user, which may be detected by one or more microphones included in the hearing device. In some implementations, the hearing system may be configured to request the user input from the user regarding the listening state of the user (e.g., by a mobile device or other user interface). In some implementations, the listening state designated by the user input may be employed for a training of the model, e.g., ML algorithm.

The hearing system may, at operation 308, perform, based on the listening state, an operation associated with the hearing device. The operation may include activating one or more sound processing properties of the hearing device, for instance when the user is in a listening state indicating that user comprehends the speech, at least to a certain degree, and/or that the user is paying attention to one or more of the speech sources, at least to a certain degree. The activating the one or more sound processing properties may include one or more of: increasing a gain of the hearing device, increasing a volume of an output signal transmitted by an output transducer included in the hearing device, modifying a property of a beamforming performed by the hearing device, selecting one or more microphones included in the hearing device to detect the one or more audio signals, and/or extracting or separating one or more of the speech signals from the audio data. Such activation of the one or more sound processing properties may further enhance hearing of the user when the user desires to comprehend the speech, e.g., to actively and intently listen to the speech contained in the one or more audio signals presented to the user.

In some implementations, the activating the one or more sound processing properties may include selecting, e.g., depending on the listening state, one or more of the speech signals for an enrollment as an audio sample in an audio processing algorithm configured to provide for a processing of the audio data depending on the enrolled audio sample. To illustrate, determining the listening state may thus be employed to automatically provide for an enrollment of a designated speaker in an audio processing algorithm. For example, the audio processing algorithm may be implemented as an algorithm providing for an identification and/or extraction and/or enhancement of speech, e.g., a DNN-based algorithm. Such an algorithm may be configured to extract and/or enhance an enrolled talker or talkers (as identified by the enrollment of the one or more speech signals), e.g., to increase speech intelligibility and/or to reduce a listening effort for the user. A technical problem associated with such an algorithm is that an enrollment of a target speaker usually has to be performed actively and/or offline by the user himself. The problem can be solved by the automatized target speaker enrollment depending on the listening state, which advantageously can provide for an unprompted enrollment, without user input, in a rolling manner, rather than using static, offline target voice enrollment. In some implementations, the activating the one or more sound processing properties may include selecting, e.g., depending on the listening state, one or more of the speech signals for a determining, based on the one or more speech signals, a direction of arrival (DOA) of the speech, wherein the direction of arrival is employed in an audio processing algorithm configured to provide for a processing of the audio data depending on the direction of arrival.

In some instances, such as when a plurality of speech signals from different speech sources in the one or more audio signals are presented (e.g., simultaneously) to the user, the activating the one or more sound processing properties may be further based on determining a target (e.g., desired) speech signal included in the plurality of speech signals to which the user intends to listen. As an illustrative example, the user may intend to listen to one speaker amongst several active speakers in an environment. Accordingly, the hearing system may determine the target speech signal (e.g., a particular speaker) to which the user intends to listen amongst the several active speakers. The determining the target speech signal may be based on the listening state, e.g., depending on whether or to which degree the user is paying attention to the one or more speech sources, and/or whether or to which degree the user comprehends the speech. To illustrate, the target speech signal may be determined depending on the head movements of the user (e.g., a frequency of the head movements within the frequency range representative of the speech comprehension and/or within the frequency range representative of the user paying attention to one or more of the speech sources, the user is nodding at times when a particular speaker is talking, the user is nodding at a frequency corresponding with a particular speaker, the user is looking in a direction of a particular speaker, the user's head is leaning towards a direction of a particular speaker, etc.). Additionally or alternatively, the target speech signal may be determined depending on the own-voice of the user (e.g., one or more back-channels to the speech contained in the own-voice data fulfilling the property representative of the speech comprehension and/or the property representative of the user paying attention to one or more of the speech sources, paralinguistic (or non-verbal) communications of the user (e.g., laughter or back-channels such as "uh-huh," "hm," "um", "sigh", "gasp" uttered by the user while a speaker is talking), and/or verbal communications of the user (e.g., the user is repeating a particular speaker). Additionally, the determining the target speech signal may be based on additional data, such as eye movements of the user (e.g., the user is looking towards a particular speaker). In some implementations, the target speech signal may be selected for the enrollment as an audio sample in an audio processing algorithm and/or for the determining of a DOA of the speech, as described above. In some implementations, based on determining the target speech signal, the hearing system may extract or separate the target speech signal from the audio data and/or filter the audio data such as to extract or enhance the target speech signal and/or attenuate other audio signals, e.g., one or more other speech signals (e.g., to which the user does not intend to listen).

As another illustrative example, the user may intend to listen to live music in a music venue while being surrounded by interfering speech. The one or more audio signals presented to the user may then also comprise one or more music signals representative of the music. The determining the target speech signal may then also be based on determining whether the user intends to listen to one or more of the speech signals or to one or more of the music signals as a target audio signal. To illustrate, determining one or more of the music signals as the target audio signal (e.g., the live music) may be based on the head movements of the user (e.g., the user is nodding at a frequency corresponding with a music). Additionally, the determining the target audio signal may be based on additional data, such as eye movements of the user (e.g., the user is looking towards the live music or the user is not looking towards a source of the speech) or verbal communications of the user (e.g., the user is singing with the live music). Based on determining the target audio signal, the hearing system may filter the audio data such as to extract or enhance the live music and/or attenuate the interfering speech.

In instances where the hearing system includes a plurality of microphones configured to detect a plurality of audio signals, the operation may comprise activating a beamforming and/or modifying a property of a beamforming performed by the hearing system, e.g., a directivity and/or beamwidth of the beamforming, depending on the target audio signal, e.g., depending on a target speech signal and/or a music signal as the target audio signal. As an illustrative example, the hearing system may include a hearing device worn at each ear of the user, each hearing device having one or more microphones, e.g., a microphone positioned toward a front portion of the hearing device and another microphone positioned toward a rear portion of the hearing device. In instances where the target audio signal (e.g., a particular speaker, live music, etc.) is located in front of the user, the hearing system may combine the audio signals of each of the microphones of the hearing devices by using the time delays between the different microphones, which may improve the detection of the target audio signal in the front of the user. Alternatively, in instances where the target audio signal (e.g., a particular speaker, live music, etc.) is located to a side of the user (e.g., the right side), the hearing system may combine the audio signals of the microphones within the hearing devices in a way which may improve the detection of the target audio signal to the side of the user. Still other suitable configurations for activating the one or more sound properties associated with the hearing device may be used.

For example, the activating the one or more sound processing properties may be further based on determining an amount (e.g., a percentage, a proportion, a range, a level, etc.) of a speech content in the one or more speech signals comprehended by the user. The amount of speech content in the one or more speech signals comprehended by the user may be determined based on the listening state, e.g., based on the information to which degree the user comprehends the speech and/or based on the comprehending listening state. In some examples, the amount of comprehended speech content may be determined based on head movements of the user, e.g., based on a proportion of time during which the head movements are within the frequency range representative of the speech comprehension and/or a proportion of the head movements having a frequency within the frequency range representative of the speech comprehension and the head movements having a frequency within the frequency range representative of the user paying attention to one or more of the speech sources. To illustrate, fast head movements performed by the user may indicate that the user comprehends a portion of the one or more speech signals during which the fast head movements are performed. Additionally, the determining the amount of speech in the one or more speech signals comprehended by the user may be based on the own-voice data, e.g. backchannels and/or verbal interjections by the user, e.g., based on whether one or more backchannels fulfill the property representative of the speech comprehension and/or a proportion of the one or more backchannels fulfilling the property representative of the speech comprehension and the one or more backchannels fulfilling the property representative of the user paying attention to one or more of the speech sources. For example, the user may repeat, reformulate, paraphrase, acknowledge, and/or ask follow-up questions in response to a portion of the one or more speech signals that the user comprehends. In some instances, a greater length and/or complexity of the verbal interjections performed by the user may indicate a higher amount of comprehension of the one or more speech signals. Based on determining the amount of speech in the one or more speech signals comprehended by the user, the hearing system may adjust the one or more sound processing properties of the hearing device to increase the amount of comprehension of the user. As an example, the hearing system may enhance the one or more audio signals by increasing a gain of the hearing device, increasing a volume of an output signal transmitted by an output transducer included in the hearing device, activate and/or modify a property of beamforming, selecting one or more microphones included in the hearing device to detect the one or more audio signals, and/or extracting or separating one or more of the speech signals from the audio data.

In some implementations, the method further comprises determining a listening effort of the user. The listening effort may be indicative of whether or to which degree the user invests effort into a listening activity, e.g., whether or to which degree the user is investing his physical and/or mental resources in an attempt to comprehend the speech. In some instances, the listening intention may be determined based on the listening effort, e.g., in addition or alternatively to the listening state. To illustrate, a larger listening effort may indicate a larger listening intention, and a smaller listening effort may indicate a smaller listening intention.

Additionally or alternatively, the activating the one or more sound processing properties may be further based on determining the listening effort exerted by the user, e.g., whether or to which degree (e.g., an amount, a percentage, a proportion, a range, a level, etc. of listening effort exerted by the user) the user invests effort into a listening activity (e.g., to comprehend the one or more speech signals). For example, an increase in the amount of listening effort exerted by the user may indicate that the user is unable to sufficiently hear the one or more speech signals. In some implementations, the amount of listening effort may be determined based on the listening state, e.g., based on the information to which degree the user comprehends the speech and/or based on the information whether the user is paying attention to the one or more speech sources. To illustrate, a rather low degree of attention payment by the user may indicate a rather low listening effort. Additionally or alternatively, the amount of listening effort exerted by the user may be determined based on physiological sensor data, e.g., based on a heart rate value of the user, a blood pressure value of the user, and/or brain activity of the user (e.g., an increase in a heart rate value, blood pressure value, and/or brain activity of the user may indicate an increase in the listening effort exerted by the user). Based on determining the amount of listening effort exerted by the user, the hearing system may adjust the one or more sound processing properties of the hearing device to reduce the amount of listening effort exerted by the user. As an example, the hearing system may enhance the one or more audio signals by increasing a gain of the hearing device, increasing a volume of an output signal transmitted by an output transducer included in the hearing device, activate and/or modify a property of beamforming, selecting one or more microphones included in the hearing device to detect the one or more audio signals, and/or extracting or separating one or more of the speech signals from the audio data.

In some implementations, the method further comprises determining a comprehension incapability state of the user based on the listening effort and the listening state, e.g., depending on whether or to which degree the user is paying attention to one or more of the speech sources; and/or whether or to which degree the user comprehends the speech in one or more of the speech signals. The comprehension incapability state may be indicative of whether or to which degree the user is uncapable to comprehend the speech. In some instances, the comprehension incapability state may be determined based on the listening effort and the attentive uncomprehending listening state, which may be indicative of whether or to which degree the user is paying attention to the one or more speech sources but not comprehending the speech.

To illustrate, when the attentive uncomprehending listening state is determined to be true or to have a rather large degree and the listening effort is also determined to be true or to be rather large, the comprehension incapability state may be determined to be true or to be rather large. This may relate to a situation in which the user has a comprehension problem which may be caused, e.g., by a problem with the user's hearing, e.g., due to a hearing loss and/or environmental sound disturbances, and/or a problem with the user's listening capabilities, e.g., due to a cognitive impairment and/or language barriers. As another example, when the attentive uncomprehending listening state is determined to be true or to have a rather large degree and the listening effort is determined to be false or to be rather small, the comprehension incapability state may be determined to be false or to be rather small. This may relate to a situation in which the user has no interest in comprehending the speech or has given up on comprehending the speech, e.g., the user is pretending to be paying attention to the speech source but is not listening, is not interested in a content of the speech or otherwise distracted.

In some examples, the comprehension incapability state may also be employed as a health indicator which may provide information about a potential health problem of the user. E.g., the health problem may include a hearing loss of the user which may not be (fully) compensated by the hearing device and/or a cognitive impairment, e.g., a cognitive decline, and/or a social detachment of the user. In some examples, the hearing device may determine additional characteristics from the audio data, e.g., by performing an advanced audio signal analysis on the audio data such as one or more of acoustic scene classification, voice-activity detection, own-voice detection, direction-of-arrival estimation, speaker identification, and automatic speech recognition, to derive the informative signals about whether the user's comprehension problem may be related to the acoustic environment. E.g., the informative signals may be derived by analyzing the acoustic scene (such as whether it contains environmental noise) and/or properties of the speech (such as a language of the speech). In a case in which no external influences for the comprehension problem of the user can be determined, a problem with the user's health may be identified.

In some examples, the activating the one or more sound processing properties may be based on the comprehension incapability state, which may be determined based on the listening effort and the listening state, e.g., based on the listening effort and the attentive uncomprehending listening state. In some instances, the operation includes activating the one or more sound processing properties of the hearing device when the comprehension incapability state indicates that user is uncapable to comprehend the speech, at least to a certain degree, and/or deactivating the one or more sound processing properties of the hearing device when the comprehension incapability state indicates that user is capable to comprehend the speech, at least to a certain degree.

The operation associated with the hearing device may further include deactivating the one or more sound processing properties depending on the listening state, e.g., when the listening state indicates that a comprehension of the speech by the user decreases and/or when the listening state indicates that an attention payment of the user to the speech source decreases. In some examples, the deactivating the one or more sound processing properties may be performed when the user transitions from a comprehending listening state of a higher degree to a comprehending listening state of a lower degree and/or from a comprehending listening state to an—inattentive uncomprehending listening state or to an attentive uncomprehending listening state. In some examples, the deactivating the one or more sound processing properties may be performed when the listening effort exerted by the user sufficiently decreases. To illustrate, in such a case, it may be concluded that an intention of the user to listen to the speech has decreased or stopped so that the one or more sound processing properties may not be beneficial.

The hearing system may be configured to dynamically update the listening state, the listening effort, and/or the amount of comprehension by the user with respect to the one or more speech signals. For example, the hearing system may continuously and/or periodically (e.g., every 10 seconds, 30 seconds, 60 seconds, 5 minutes, 10 minutes, etc.) monitor and/or determine the listening state, the listening effort, and/or the amount of comprehension by the user. In instances where the user stops comprehendingly and/or actively and/or intently listening, the listening effort sufficiently decreases, and/or the amount of comprehension sufficiently increases while the one or more audio signals are received, the hearing device may deactivate the one or more sound processing properties of the hearing device. Additionally or alternatively, the hearing system may be configured to dynamically monitor a presence of the one or more speech signals in the audio data. In instances where the detection of the one or more speech signals ends, the hearing device may deactivate the determining of the listening state and/or the one or more sound processing properties of the hearing device. Such deactivation of the one or more sound processing properties of the hearing device may reduce the resources consumed by the hearing system. In some implementations, the operation may include providing a notification indicating the listening state and/or information derived from the listening state. For instance, the notification may include information (e.g., information about the listening state, a listening intention, a comprehension incapability state, a classification, a duration, information used to determine the listening state, such as head movements, heart rate values, blood pressure values, eye movements, brain activity, listening effort, comprehension, etc.) associated with the listening state of the user. The information derived from the listening state may be based on one or more of the inattentive uncomprehending listening state, the attentive uncomprehending listening state, the comprehending listening state, the listening intention, the listening effort, and the comprehension incapability state, e.g., when monitored over time. In some examples, the information derived from the listening state may be additionally based on additional characteristics from the audio data, e.g., by performing an audio signal analysis on the audio data such as one or more of an acoustic scene classification, voice-activity detection, own-voice detection, direction-of-arrival estimation, speaker identification, and automatic speech recognition. In some examples, the information derived from the listening state may be additionally based on physiological sensor data indicative of a physiological property of the user, which may be received from a physiological sensor included in the hearing device and/or in a user device.

To illustrate, the information may comprise, e.g., a speech source attentiveness indicator representative of whether or to what degree the user is paying attention to the one or more speech sources, a speech comprehension indicator representative of whether or to what degree the user comprehends the speech, a speech source ignorance indicator representative of whether or to what degree the user is ignoring the one or more speech sources and the content of the speech, a conversation following indicator representative of whether or to what degree the user is following a conversation with the one or more speech sources, a social signaling indicator representative of whether or to what degree the user is sending social signals to the one or more speech sources, a social relationship indicator representative of a sympathy or closeness of the user and the one or more speech sources or of a degree thereof, a listening intention indicator representative of whether or to what degree the user intends to listen to the speech, a listening effort indicator representative of a degree to which the user exerts an effort to listen to the speech, etc.) In some implementations, the information may be derived from the listening state by monitoring the listening state over time, e.g., by a data-logging of the listening state, and determining the information derived from the listening state from the monitored listening state. E.g., the monitored listening state may be averaged and/or statistically evaluated and/or outliers from an average may be determined. In some examples, the listening state may be monitored over a time period in which the audio data is indicative of a plurality of turn takings in the speech of the speech source and the user and/or over a longer period of time such as hours, days, weeks, or months.

The notification may be provided to the user and/or a third party (e.g., a caregiver, an interlocutor, etc.) associated with the user. For example, the notification may be provided to a display device communicatively coupled (e.g., by way of a wired and/or wireless connection) with the hearing system. The display device may be included in the hearing device and/or a different wearable device separate from the hearing device (e.g., a watch or a mobile device worn or carried by the user and/or third party). As another example, the notification may be provided as a data output which may be readable by a data analysis device, e.g., a personal computer.

Such a notification may provide feedback to the user such as regarding social signaling and/or behavior of the user (e.g., during a conversation) and/or inform a third party with respect to whether the user is cooperative or is following a conversation (e.g., for motivational coaching). The notification may further notify the user and/or the third party of long-term changes associated with the listening state of the user (e.g., changes in head-movement patterns, such as changes in presence, direction, and/or strength of head movements), which may indicate changes in functional health of the user. Additionally or alternatively, the notification may be provided to a device (e.g., a smartphone and/or a virtual assistant device), such that the device may adjust one or more settings based on the notification and/or the notification may include an acoustic signal (e.g., to alert the user of a small or decreased attentiveness (or paying attention) to the one or more speech sources, e.g., when the user is in an inattentive uncomprehending listening state or in an attentive uncomprehending listening state. The notification may be provided in real time (e.g., during the detection of the one or more audio signals) and/or after the detection of the one or more audio signals.

In some implementations, the operation comprises outputting, depending on the listening state, information derived from the audio data. In some instances, the information derived from the audio data may comprise an alert detected in the environment of the user. The information about the alert may then be outputted to the user when the listening state indicates a rather high degree of comprehension of the speech by the user, e.g., when the user is in a comprehending listening state. To illustrate, such a situation may indicate that the user may be distracted from the alert in his surroundings when actively following the speech. In some instances, the information derived from the audio data may comprise a speech message detected in the one or more speech signals, e.g., a warning message uttered by a conversation partner. The information about the speech message may then be outputted to the user when the listening state indicates a rather low degree of comprehension of the speech by the user, e.g., when the user is in an inattentive uncomprehending listening state, or in an attentive uncomprehending listening state. To illustrate, such a situation may indicate that the user may not have understood the speech message when at least not fully comprehending the speech. Additionally or alternatively, the operation may include generating a model including data representative of the listening state of the user. The generating the model may include collecting and/or updating data associated with one or more listening characteristics (e.g., head movements, backchannels in the user's own-voice, heart rate values, blood pressure values, eye movements, facial expressions, body language, verbal interjections, non-verbal interjections, etc.) that may be used to determine the listening state of the user. The model may then be used to determine and/or predict future listening states of the user with respect to one or more speech signals (e.g., based on the one or more listening characteristics associated with the previously determined listening states of the user). For example, the determining the listening state may include comparing a frequency of the head movements with reference data included in the model and representative of predetermined head movement frequencies for active and/or intent listening. Moreover, the model may be generated and/or updated to include predetermined speech signals (e.g., a particular speaker) that the user previously listened to in a comprehending and/or attentive uncomprehending listening state such that the one or more sound processing properties of the hearing device may be activated with respect to detecting the predetermined speech signals. In some examples, the model may be stored by the hearing system (e.g., in memory 112). In some examples, the model may be implemented as an ML algorithm.

Figure 4:
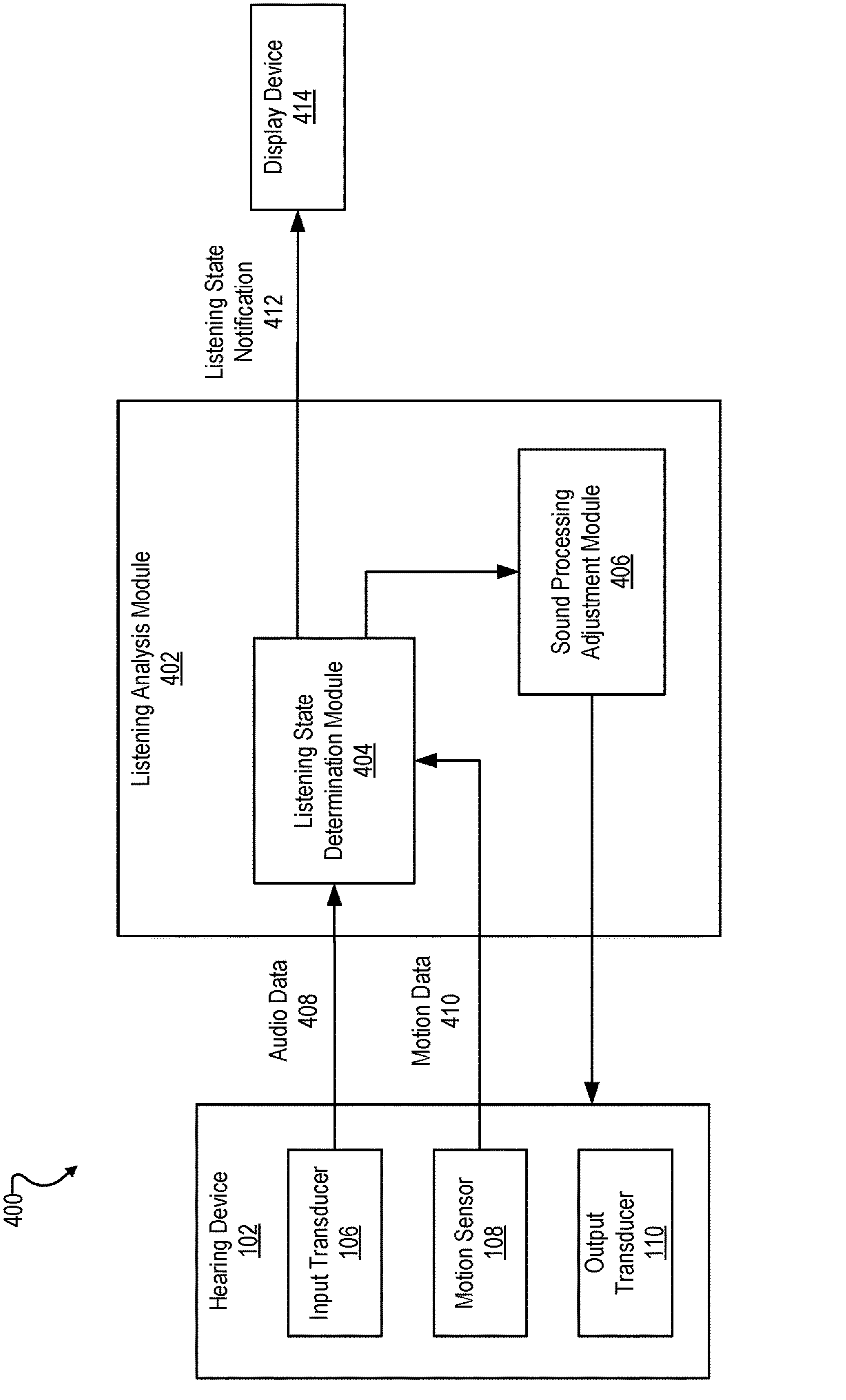
FIG. 4 shows an illustrative implementation of a listening analysis module that may be incorporated into a hearing system.

FIG. 4 shows an illustrative implementation 400 of a listening analysis module 402 that may be implemented by a hearing system according to the principles described herein and configured to determine a listening state of the user. As shown, listening analysis module 402 may include a listening state determination module 404 and a sound processing adjustment module 406. Listening analysis module 402 may include additional or alternative components as may serve a particular implementation.

Listening state determination module 404 of listening analysis module 402 may be configured to receive audio data 408 provided by one or more input transducers 106, the audio data including one or more speech signals representative of a speech from one or more speech sources different from the user, acquire motion data 410 generated by motion sensor 108 and/or own-voice data included in audio data 408, and to determine, based on the own voice data and/or motion data 410, a listening state of the user relative to the one or more speech signals (e.g., an inattentive uncomprehending listening state, an attentive uncomprehending listening state, or a comprehending listening state). For example, listening state determination module 404 may be configured to receive audio data 408 representative of one or more audio signals presented to the user, the audio data including one or more speech signals representative of a speech from one or more speech sources different from the user. Based on the one or more speech signals, listening state determination module 404 may acquire motion data 410 representative of head movements of the user and/or own-voice data representative of backchannels of the user to the speech, and determine, based on the head movements and/or backchannels, the listening state of the user. To illustrate, the listening state of the user may be determined based on a frequency of the head movements, a direction of the head movements, a magnitude of the head movements, an acceleration of the head movements, a timing of head movements, and/or a duration of the head movements. To further illustrate, the listening state of the user may also be determined based on one or more properties of the one or more backchannels, e.g., a complexity, length, number and/or type of the backchannels. In some implementations, motion data 410 and/or the own-voice data may be input on a model configured to determine whether or to what degree the input matches a predetermined pattern indicative of the listening state, and to output the listening state and/or the operation to be performed based on the listening state. In some implementations, the model may include one or more listening characteristics of the user in one or more listening states, which may define the predetermined pattern indicative of the listening state, to determine the listening state of the user. In some implementations, the model is implemented as an ML algorithm which may be trained, e.g., based on motion data and/or own-voice data of the user and/or other individuals, which motion data and/or own-voice data may be labelled with a corresponding listening state.

In some instances, listening state determination module 404 may determine that the user comprehends the speech, e.g., is in a comprehending listening state, when a frequency of the head movements is within the frequency range representative of the speech comprehension, for instance within a frequency range having a lower limit of 2 Hz or larger (e.g., between 2 Hz to 6.5 Hz), such as for a predetermined amount of time relative to a duration of the one or more speech signals, and/or a frequency of the head movements corresponds to a frequency of one or more of the speech signals. Additionally or alternatively, listening state determination module 404 may determine that the user comprehends the speech, e.g., is in a comprehending listening state, when one or more backchannels in the own-voice data (e.g., verbal interjections of the user and/or non-verbal interjections of the user) fulfill a predetermined property representative of the speech comprehension, e.g., a length, a complexity, a number, a type, etc. In some implementations, the determining the listening state may be further based on additional data representative of one or more of a heart rate of the user, a blood pressure of the user, eye movements of the user, facial expressions of the user, body language of the user, a proximity of the user to the one or more speech sources, or a user input designating the listening state of the user.

Listening state determination module 404 may further be configured to determine a change in the listening state. For example, listening state determination module 404 may be configured to determine a change in the head movements of the user, a change in the property of the backchannels, a listening effort of the user, a comprehension of the user, a listening intention, a comprehension incapability state, and/or a target speech signal.

In some implementations, the listening state may be determined binarily (e.g., as true or false), such as based on the occurrence of a particular listening characteristic (e.g., a magnitude of the head movements within the frequency range representative of the speech comprehension and/or attention payment exceeding a predetermined magnitude threshold). Alternatively, the listening state may be determined as a degree to which the user is paying attention to the one or more speech sources and/or as a degree to which the user comprehends the speech, which may be based, e.g., on a proportion of the occurrence of the particular listening characteristic relative to the duration of the one or more speech signals (e.g., a proportion time during which a magnitude of the head movements within the frequency range representative of the speech comprehension and/or attention payment exceed the predetermined threshold during the one or more speech signals), and/or may be based on a likelihood that the acquired motion data and/or own-voice data matches a predetermined pattern indicative of the listening state.

Listening state determination module 404 may further determine a listening state notification 412 based on the listening state of the user. In some examples, listening state notification 412 may be implemented as a notification indicating the listening state, e.g., a listening state value represented by any suitable metric, such as a discrete value (e.g., a percentage, a level, a range, a probability value, etc.) and/or a classification representative of a level of the listening state of the user. In some implementations, a listening state value 412 having a higher value within a given range, e.g. between 1 to 100 (e.g., greater than about 50, greater than about 75, and/or greater than about 90), may indicate a comprehending and/or intent listening state with respect to one or more speech signals. Alternatively, a listening state value 412 having a lower value (e.g., less than about 49, less than about 25, and/or less than about 10) may indicate an inattentive uncomprehending listening state and/or an attentive uncomprehending listening state. In some examples, listening state notification 412 may be implemented as a notification indicating information derived from the listening state of the user, e.g., based on a monitoring of the listening state over time, as described above. Listening state determination module 404 may be communicatively coupled with a display device 414 (e.g., a watch or a mobile device worn or carried by the user) such that listening state determination module 404 may cause listening state notification 412 to be displayed by display device 414.

Based on the listening state of the user, sound processing adjustment module 406 may perform an operation associated with hearing device 102. The operation may include activating one or more sound processing properties of hearing device 102 when the user is in a comprehending listening state, such as increasing a gain of hearing device 102, increasing a volume of an output signal transmitted by an output transducer 110 included in hearing device 102, modifying a property of a beamforming performed by hearing device 102, selecting one or more microphones 106 included in the hearing device to detect the one or more audio signals, and/or extracting or separating one or more of the speech signals from the audio data, e.g., by filtering audio data 408 to extract the one or more speech signals. In some implementations, the activating the one or more sound processing properties may additionally include determining a target audio signal, e.g., a target speech signal, included in the one or more audio signals, determining an amount of content in the one or more speech signals comprehended by the user, and/or determining a a listening intention, a comprehension incapability state and/or a listening effort exerted by the user. Additionally or alternatively, the operation may include deactivating the one or more sound processing properties, such as when the user transitions to an inattentive uncomprehending listening state or an attentive uncomprehending listening state, providing notification 412 indicating the listening state of the user and/or information derived from the listening state, and/or generating a model including data representative of the listening state of the user.

Figure 5:
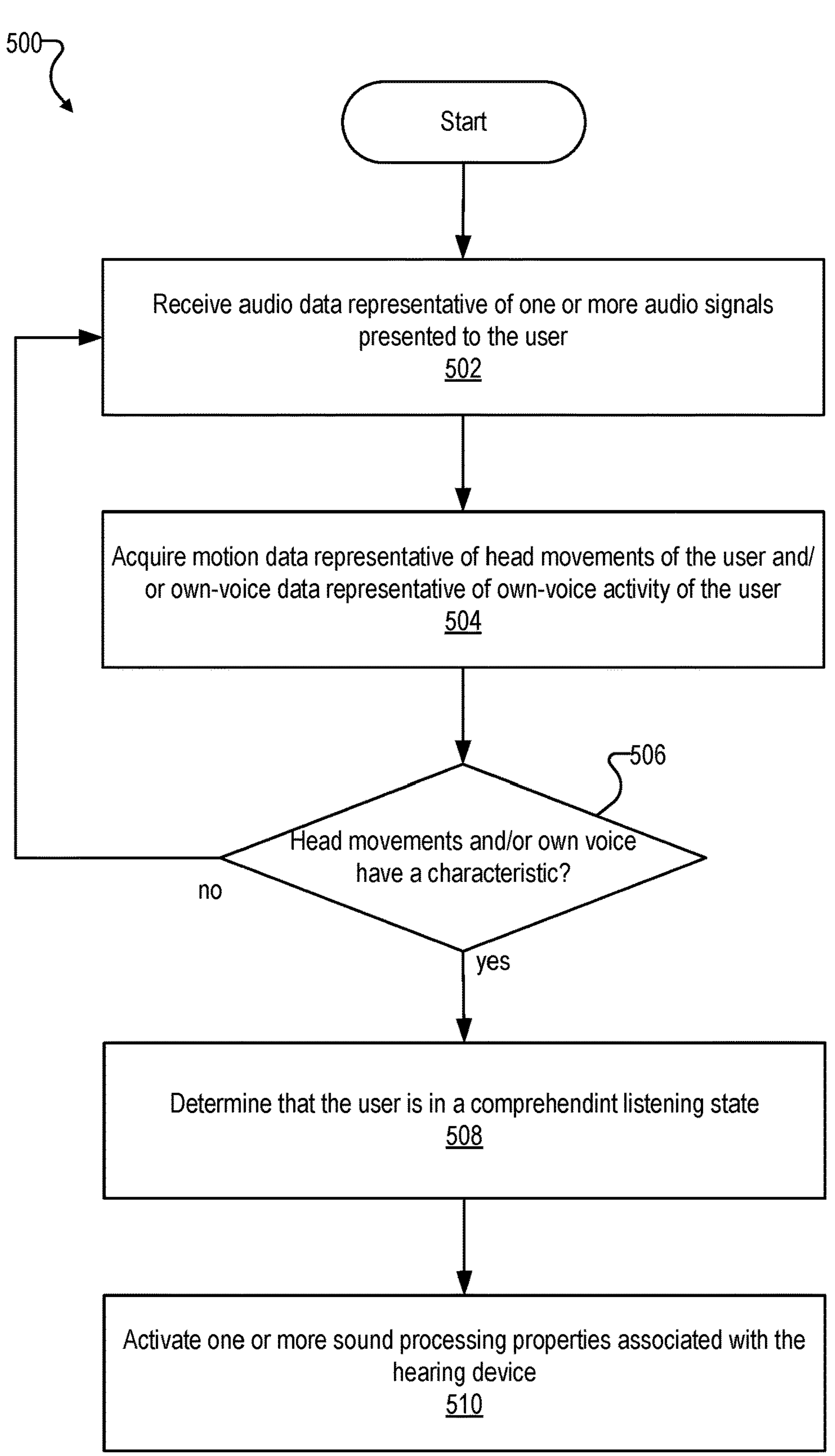
FIG. 5 shows an illustrative method of operating a hearing system including a listening analysis module.

FIG. 5 shows another illustrative method 500 that may be performed by a hearing system according to the principles described herein. While FIG. 5 illustrates exemplary operations according to one embodiment, other embodiments may omit, add to, reorder, and/or modify any of the operations shown in FIG. 5. Moreover, each of the operations depicted in FIG. 5 may be performed in any of the ways described herein.

As shown, a hearing system may, at operation 502, receive (e.g., from one or more input transducers 106 included in hearing device 102) audio data representative of one or more audio signals presented to the user. The audio data includes one or more speech signals representative of a speech from one or more speech sources different from the user. In some examples, the one or more audio signals may comprise one or more speech signals including, e.g., one or more of: verbal communication (e.g., speech) from one or more third parties (e.g., in-person and/or remotely, such as using a phone, videoconferencing, etc.), or communication (e.g., verbal communication, music, etc.) from a device (e.g., a virtual assistant device, a television, a smartphone, etc.). The audio data may further include one or more other audio signals, e.g., one or more music signals representative of music and/or one or more environmental sound signals representative of sound in the environment of the user. The audio data may further include own-voice data representative of an own-voice activity of the user. In some examples, the own-voice data may comprise one or more own-voice signals, e.g., backchannels to a speech such as verbal interjections from the user and/or non-verbal interjections (e.g., laughter, gasps, sighs, interjections, etc.) from the user.

The hearing system may, at operation 504, acquire (e.g., from motion sensor 108 included in hearing device 102) motion data representative of head movements of the user while the user wears the hearing device. In some examples, the head movements may include one or more of: head nodding (e.g., nonconscious, involuntary, or to indicate approval), head shaking (e.g., to indicate disapproval), head tilting (e.g., to indicate thought), or head leaning (e.g., toward the one or more speech signals). Additionally, the motion data may include one or more characteristics (e.g., a frequency, a direction, a magnitude, an acceleration, a duration, etc.) of the head movements.

Additionally or alternatively, the hearing system may, at operation 304, acquire, own-voice data representative of an own-voice activity of the user. The own-voice data may be included in the audio data received from the one or more input transducers. In some examples, the own-voice data may be extracted and/or separated from the audio data, e.g. by a signal analysis performed on the audio data and/or by an ML algorithm configured to separate the own-voice data from the audio data. In some examples, the own-voice data may be received from an own-voice detected implemented as one or more of the input transducers. In some examples, the own-voice of the user may include verbal backchannels, e.g., interjections, from the user to the speech (e.g., speech, repeats, reformulations, responses, follow-up questions, paraphrasing, and acknowledgements) and/or non-verbal backchannels, e.g., interjections, from the user to the speech (e.g., laughter, gasps, sighs, giggling, moaning, paralinguistic expressions, and monosyllabic utterances).

The hearing system may, at operation 506, determine whether the head movements and/or the user's own-voice have a predetermined characteristic. The characteristic may comprise that a frequency of the head movements is within the frequency range representative of the speech comprehension. Alternatively or additionally, the characteristic may comprise that one or more backchannels to the speech contained in the own-voice data fulfill the property representative of the speech comprehension, e.g., with regard to a length, a complexity, a number, and/or a type of the backchannels. If the frequency of the head movements is not within the frequency range representative of the speech comprehension and/or the one or more backchannels do not fulfill the property representative of the speech comprehension (e.g., no, at operation 506), the hearing system may determine that the user is not comprehending the speech contained in the one or more speech signals. Accordingly, the hearing system may end method 500 and/or continue receiving the audio data and motion data (e.g., to monitor the frequency of the head movements) and/or own-voice data (e.g., to monitor the backchannels). Alternatively, if the frequency of the head movements is within the frequency range representative of the speech comprehension (e.g., yes, at operation 506) and/or the one or more backchannels do fulfill the property representative of the speech comprehension, the hearing system may, at operation 508, determine that the user is in a comprehending listening state. In some implementations, the determining that the head movements and/or the user's own-voice have the predetermined characteristic may include determining that the head movements and/or the user's own-voice have the predetermined characteristic for a predetermined amount of time.

The hearing system may further, at operation 510, activate one or more sound processing properties associated with the hearing device, such as increasing a gain of the hearing device, increasing a volume of an output signal transmitted by an output transducer included in the hearing device, modifying a property of a beamforming performed by the hearing device, selecting one or more microphones included in the hearing device to detect the one or more audio signals, extracting or separating one or more of the speech signals from the audio data, e.g., by filtering the audio data to extract the one or more speech signals, determining a target audio signal, e.g., a target speech signal, included in the one or more audio signals, determining an amount of the one or more speech signals comprehended by the user, and/or determining a listening intention, a comprehension incapability state and/or a listening effort exerted by the user.

Figure 6:
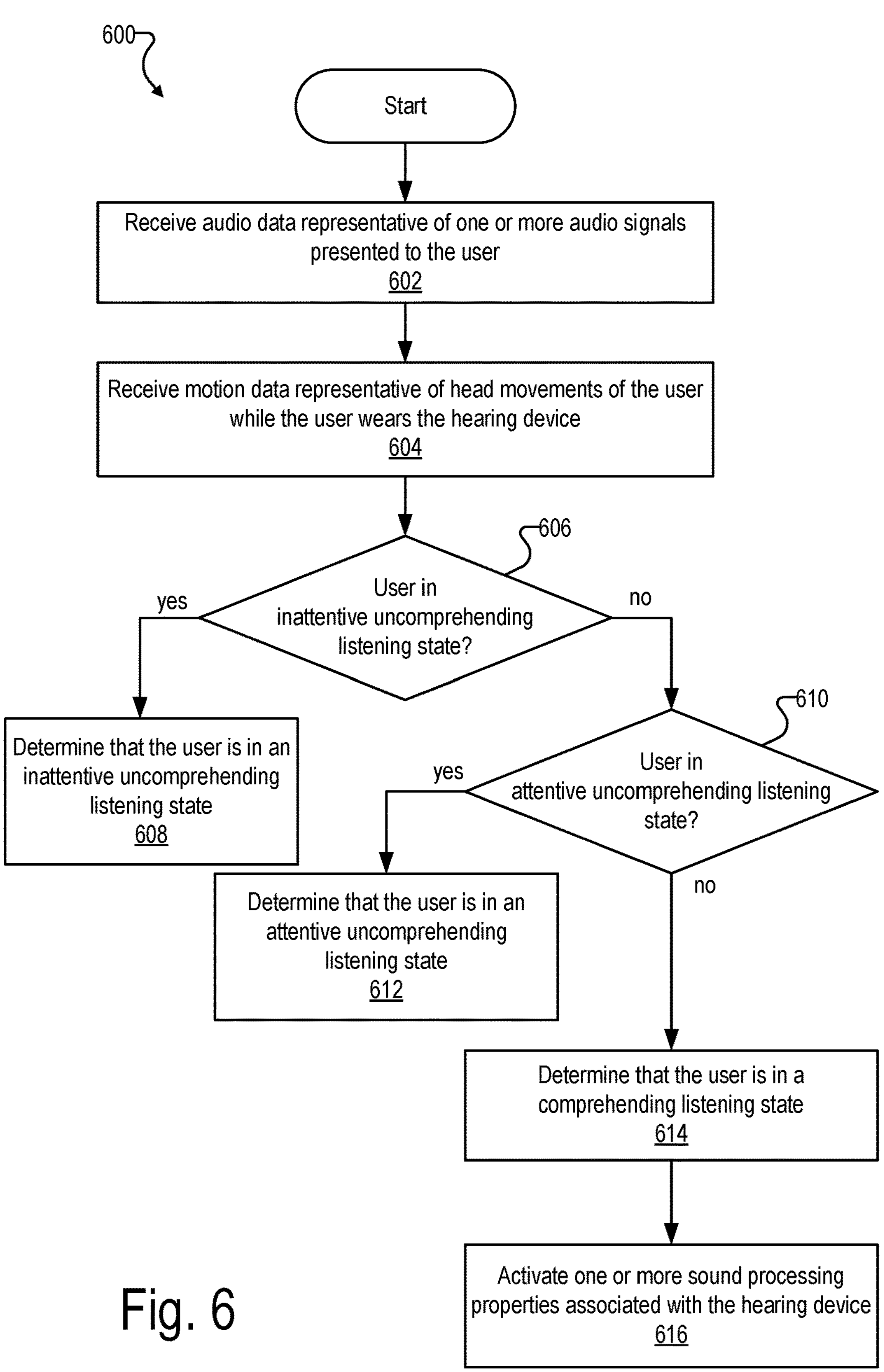
FIG. 6 shows another illustrative method of operating a hearing system including a listening analysis module.

FIG. 6 shows another illustrative method 600 that may be performed by a hearing system according to the principles described herein. While FIG. 6 illustrates exemplary operations according to one embodiment, other embodiments may omit, add to, reorder, and/or modify any of the operations shown in FIG. 6. Moreover, each of the operations depicted in FIG. 6 may be performed in any of the ways described herein.

As shown, a hearing system may, at operation 602, receive (e.g., from one or more input transducers 106 included in hearing device 102) audio data representative of one or more audio signals presented to the user. The audio data includes one or more speech signals representative of a speech from one or more speech sources different from the user. The audio data may further include one or more other audio signals, e.g., one or more music signals and/or one or more environmental sound signals. The audio data may further include own-voice data representative of an own-voice activity of the user.

The hearing system may, at operation 604, receive (e.g., from motion sensor 108 included in hearing device 102) motion data representative of head movements of the user while the user wears the hearing device. Additionally or alternatively, the hearing system may, at operation 304, acquire, own-voice data included in the audio data, which may be representative of backchannels to the speech.

In some implementations, the hearing system may further receive data from one or more additional sensors, such as one or more of: physiological sensor data which may include heart rate data representative of one or more heart rate values of the user (e.g., from a heart rate sensor) and/or blood pressure data representative of one or more blood pressure values of the user (e.g., from a blood pressure sensor), and/or motion data representative of other motion (e.g., eye movements, facial expressions, body language, etc.) of the user.

The hearing system may, at operation 606, determine whether the user is in an inattentive uncomprehending listening state, which may also be denoted as a not-listening state. For example, the hearing system may determine that the user is in a not-listening state when the user does not perform head movements, when the user does not exhibit facial expressions, and/or when the user does not provide verbal and/or non-verbal interjections with respect to the one or more speech signals. If the user is in a not-listening state (e.g., yes, at operation 606), the hearing system may, at operation 608, determine that the user is in a not-listening state. In instances where a sound processing property of the hearing device was previously activated, the hearing system may further deactivate the one or more sound processing properties.

Alternatively, if the user is not in a not-listening state (e.g., no, at operation 606), the hearing system may, at operation 610, determine whether the user is further in an attentive uncomprehending listening state, which may also be denoted as a paying-attention-without-understanding state. For example, the hearing system may determine that the user is in a paying-attention-without-understanding state when a proportion the involuntary and fast head movements to the voluntary and slow head movements of the user does not exceed a predetermined value, a frequency of the head movements of the user does not correspond to a frequency of the one or more speech signals, when a direction of the head movements of the user does not correspond to a direction of the one or more speech signals, and/or when a proportion of non-verbal interjections to verbal interjections performed by the user is greater than a predetermined value. If the user is in a paying-attention-without-understanding state (e.g., yes, at operation 610), the hearing system may, at operation 612, determine that the user is in a paying-attention-without-understanding state. In instances where a sound processing property of the hearing device was previously activated, the hearing system may further deactivate the one or more sound processing properties.

Alternatively, if the user is not in a paying-attention-without-understanding state (e.g., no, at operation 610), the hearing system may, at operation 614, determine that the user is in a comprehending listening state, which may also be denoted as an active listening state. The hearing system may further, at operation 616, activate one or more sound processing properties associated with the hearing device, such as increasing a gain of the hearing device, increasing a volume of an output signal transmitted by an output transducer included in the hearing device, modifying a property of a beamforming performed by the hearing device, selecting one or more microphones included in the hearing device to detect the one or more audio signals, extracting or separating one or more of the speech signals from the audio data, e.g., by filtering the audio data to extract the one or more speech signals, determining a target audio signal, e.g., a target speech signal, included in the one or more audio signals, determining an amount of the one or more speech signals comprehended by the user, and/or determining a listening intention, a comprehension incapability state and/or a listening effort exerted by the user.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM") or static random access memory ("SRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 7:
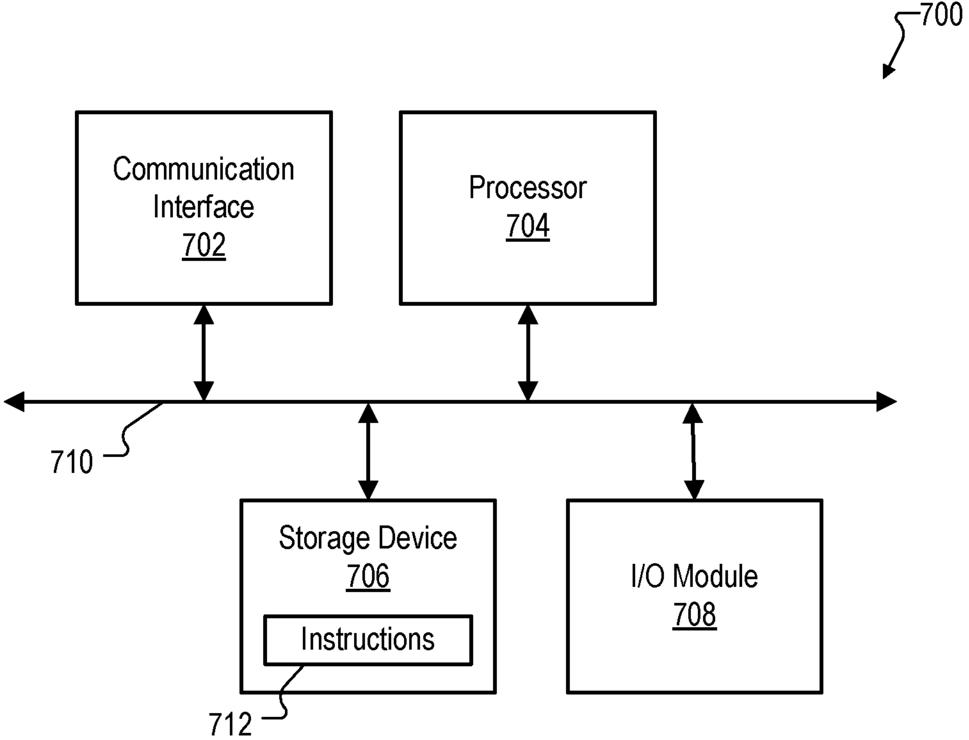
FIG. 7 shows an illustrative computing system according to the principles described herein.

FIG. 7 shows an illustrative computing device 700 that may be specifically configured to perform one or more of the processes described herein. Any of the systems, computing devices, and/or other components described herein may be implemented by computing device 700.

As shown in FIG. 7, computing device 700 may include a communication interface 702, a processor 704, a storage device 706, and an input/output ("I/O") module 708 communicatively connected one to another via a communication infrastructure 710. While an illustrative computing device 700 is shown in FIG. 7, the components illustrated in FIG. 7 are not intended to be limiting. Additional or alternative components may be used in other embodiments. Components of computing device 700 shown in FIG. 7 will now be described in additional detail.

Communication interface 702 may be configured to communicate with one or more computing devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data and/or interpreting, executing, and/or directing execution of one or more of the instructions, processes, and/or operations described herein. Processor 704 may perform operations by executing computer-executable instructions 712 (e.g., an application, software, code, and/or other executable data instance) stored in storage device 706.

Storage device 706 may include one or more data storage media, devices, or configurations and may employ any type, form, and combination of data storage media and/or device. For example, storage device 706 may include, but is not limited to, any combination of the non-volatile media and/or volatile media described herein. Electronic data, including data described herein, may be temporarily and/or permanently stored in storage device 706. For example, data representative of computer-executable instructions 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), a vibration motor, one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
- a memory storing instructions; and
- one or more processors communicatively coupled to the memory and configured to execute instructions to perform a process comprising:
  - receiving, from an input transducer included in a hearing device configured to be worn by a user, audio data representative of one or more audio signals presented to the user, the audio data including one or more speech signals representative of a speech from one or more speech sources different from the user;
  - acquiring one or more of:
    - motion data received from a motion sensor included in the hearing device, the motion data representative of head movements of the user while the user wears the hearing device; or
    - own-voice data included in the audio data, the own-voice data representative of an own-voice activity of the user;
  - determining, based on at least one of the motion data or the own-voice data, a listening state of the user with respect to the one or more speech signals, wherein the determining the listening state comprises:

determining a paying attention state representative of whether or to which degree the user intends to pay attention to any of the one or more speech signals; and determining a comprehension state representative of whether or which degree the user comprehends the one or more speech signals; and performing, based on the listening state, an operation associated with the hearing device, wherein the operation comprises:

activating one or more sound processing properties of the hearing device when the listening state includes both of an attentive state representative of the user intending to pay attention to the one or more speech signals and a comprehending state representative of the user comprehending the one or more speech signals; and deactivating the one or more sounds processing properties of the hearing device when the listening state includes one or both of an inattentive state representative of the user not intending to pay attention to any of the one or more speech signals or an uncomprehending state representative of the user not comprehending the one or more speech signals.

2. The system of claim 1, wherein the determining the listening state is based on one or more of a frequency of the head movements, a direction of the head movements, a magnitude of the head movements, an acceleration of the head movements, a timing of the head movements, or a duration of the head movements.

3. The system of claim 1, wherein the determining the listening state includes classifying the listening state as one or more of an inattentive uncomprehending listening state, an attentive uncomprehending listening state, or a comprehending listening state.

4. The system of claim 1, wherein the determining the comprehension state includes determining that the user comprehends the speech based on a frequency of the head movements being within a predetermined frequency range representative of the speech comprehension.

5. The system of claim 4, wherein the frequency range representative of the speech comprehension comprises frequencies larger than 2 Hertz.

6. The system of claim 4, wherein the determining the paying attention state includes determining that the user is paying attention to one or more of the speech sources without comprehending the speech based on a proportion of the head movements having a frequency within the frequency range representative of the speech comprehension and the head movements having a frequency within a predetermined frequency range representative of the user paying attention to one or more of the speech sources.

7. The system of claim 6, wherein the frequency range representative of the user paying attention to one or more of the speech sources comprises frequencies smaller than the frequencies in the frequency range representative of the speech comprehension.

8. The system of claim 4, wherein the determining that the user comprehends the speech is further based on a proportion of time during which the head movements are within the frequency range representative of the speech comprehension.

9. The system of claim 1, wherein the determining the comprehension state includes one or more of determining that the user comprehends the speech based on a frequency of the head movements corresponding to a frequency of the speech or determining that, when the audio data includes one or more music signals representative of a music, the user is listening to the music based on a frequency of the head movements corresponding to a frequency of the music.

10. The system of claim 1, wherein the determining the comprehension state includes determining that the user comprehends the speech based on one or more backchannels to the speech in the own-voice data fulfilling a predetermined property representative of the speech comprehension.

11. The system of claim 10, wherein the determining the paying attention state includes determining that the user is paying attention to one or more of the speech sources without comprehending the speech based on a proportion of the one or more backchannels fulfilling the property representative of the speech comprehension and one or more backchannels fulfilling a property representative of the user paying attention to one or more of the speech sources.

12. The system of claim 1, wherein the operation includes selecting one or more of the speech signals for one or more of:

an enrollment as an audio sample in an audio processing algorithm configured to provide for a processing of the audio data based on the enrolled audio sample; or a determining a direction of arrival (DOA) of the speech, wherein the direction of arrival is employed in an audio processing algorithm configured to provide for a processing of the audio data based on the direction of arrival.

13. The system of claim 1, wherein the activating the one or more sound processing properties includes one or more of increasing a gain of the hearing device, increasing a volume of an output signal transmitted by an output transducer included in the hearing device, modifying a property of a beamforming performed by the hearing device, selecting one or more microphones included in the hearing device to detect the one or more audio signals, or extracting or separating one or more of the speech signals from the audio data.

14. The system of claim 1, wherein the activating the one or more sound processing properties is further based on determining a target speech signal from the one or more speech signals included in the audio data.

15. The system of claim 1, wherein the activating the one or more sound processing properties is further based on determining a listening effort exerted by the user.

16. The system of claim 1, wherein the operation further includes deactivating the one or more sound processing properties based on one or more of when the listening state indicates that a comprehension of the speech by the user decreases or when the listening state indicates that an attention payment of the user to the one or more speech sources decreases.

17. The system of claim 1, wherein the operation includes providing a notification indicating one or more of the listening state or information derived from the listening state.

18. A hearing device configured to be worn by a user, the hearing device comprising:

an input transducer;

a motion sensor; and a processing unit communicatively coupled to the input transducer and the motion sensor, the processing unit configured to:

receive, from the input transducer, audio data representative of one or more audio signals presented to the user, the audio data including one or more speech signals representative of a speech from one or more speech sources different from the user;

acquire one or more of:

motion data received from a motion sensor, the motion data representative of head movements of the user while the user wears the hearing device; or own-voice data included in the audio data, the own-voice data representative of an own-voice activity of the user;

determine, based on at least one of the motion data or the own-voice data, a listening state of the user with respect to the one or more speech signals, wherein the determining the listening state comprises:

determining a paying attention state representative of whether or to which degree the user intends to pay attention to any of the one or more speech signals; and determining a comprehension state representative of whether or which degree the user comprehends the one or more speech signals; and perform, based on the listening state, an operation associated with the hearing device, wherein the operation comprises:

activating one or more sound processing properties of the hearing device when the listening state includes both of an attentive state representative of the user intending to pay attention to the one or more speech signals and a comprehending state representative of the user comprehending the one or more speech signals; and deactivating the one or more sounds processing properties of the hearing device when the listening state includes one or both of an inattentive state representative of the user not intending to pay attention to any of the one or more speech signals or an uncomprehending state representative of the user not comprehending the one or more speech signals.

19. A method comprising:

receiving, from an input transducer included in a hearing device configured to be worn by a user, audio data representative of one or more audio signals presented to the user, the audio data including one or more speech signals representative of a speech from one or more speech sources different from the user;

acquiring one or more of:

motion data received from a motion sensor included in the hearing device, the motion data representative of head movements of the user while the user wears the hearing device; or own-voice data included in the audio data, the own-voice data representative of an own-voice activity of the user;

determining, based on at least one of the motion data or the own-voice data, a listening state of the user with respect to the one or more speech signals, wherein the determining the listening state comprises:

determining a paying attention state representative of whether or to which degree the user intends to pay attention to any of the one or more speech signals; and determining a comprehension state representative of whether or which degree the user comprehends the one or more speech signals; and performing, based on the listening state, an operation associated with the hearing device, wherein the operation comprises:

activating one or more sound processing properties of the hearing device when the listening state includes both of an attentive state representative of the user intending to pay attention to the one or more speech signals and a comprehending state representative of the user comprehending the one or more speech signals; and deactivating the one or more sounds processing properties of the hearing device when the listening state includes one or both of an inattentive state representative of the user not intending to pay attention to any of the one or more speech signals or an uncomprehending state representative of the user not comprehending the one or more speech signals.

* * * * *